United States Patent
Harris

(10) Patent No.: US 7,543,454 B2
(45) Date of Patent: Jun. 9, 2009

(54) METHOD AND AUXILIARY SYSTEM FOR OPERATING A COMFORT SUBSYSTEM FOR A VEHICLE

(75) Inventor: Warner Olan Harris, Desert Hot Springs, CA (US)

(73) Assignee: Zero Emission Systems, Inc., Dallas, TX (US)

( * ) Notice: Subject to any disclaimer, the term of this patent is extended or adjusted under 35 U.S.C. 154(b) by 494 days.

(21) Appl. No.: 11/374,709

(22) Filed: Mar. 14, 2006

(65) Prior Publication Data

US 2006/0207274 A1 Sep. 21, 2006

Related U.S. Application Data

(60) Provisional application No. 60/661,668, filed on Mar. 14, 2005.

(51) Int. Cl.
B60H 1/32 (2006.01)
(52) U.S. Cl. .................. 62/115; 62/236; 62/323.1; 417/362
(58) Field of Classification Search .......... 62/236, 62/239–244, 115; 417/362; 464/178, 184
See application file for complete search history.

(56) References Cited

U.S. PATENT DOCUMENTS

| 2,467,398 | A | * | 4/1949 | Miller .................. 62/208 |
| 2,810,293 | A | | 10/1957 | George et al. |
| 2,923,171 | A | | 2/1960 | Jedrzykowski |
| 2,930,242 | A | | 3/1960 | George |
| 3,209,604 | A | | 10/1965 | Mitchell et al. |
| 3,597,935 | A | * | 8/1971 | Pierrat .................. 62/163 |
| 3,599,814 | A | | 8/1971 | Brownfield |
| 3,646,773 | A | * | 3/1972 | Falk et al. ............ 62/160 |

(Continued)

FOREIGN PATENT DOCUMENTS

EP 114053381 1/2003

(Continued)

OTHER PUBLICATIONS

U.S Army Public Affairs Office, "TARDEC Sponsors cross-country fuel cell truck expedition." RDECOM Magazine, Jul. 2005, p. 6. Aberdeen Proving Ground, MD.

(Continued)

*Primary Examiner*—William E Tapolcai
(74) *Attorney, Agent, or Firm*—Fish & Richardson P.C.; Kelly Kordzik; Anthony V. S. England

(57) ABSTRACT

According to one form of the invention, an auxiliary system is provided for supplying air conditioning to the cabin of a truck. The system includes an air conditioning compressor having a jackshaft mounted on a hub of the compressor. The system further includes an electric motor connected to the jackshaft by a belt for the motor, wherein the electric motor has a drive shaft and a pulley rigidly secured thereon, i.e., with no clutch and with no provision for slippage of the pulley relative to the drive shaft. The jackshaft has a pulley thereon for the electric motor drive. An end of the jackshaft that is not proximate to the compressor is rotatably held by a bearing and a bearing bracket in order to increase capability of the jackshaft to withstand side loading.

54 Claims, 17 Drawing Sheets

U.S. PATENT DOCUMENTS

| | | | |
|---|---|---|---|
| 3,716,768 A | | 2/1973 | Mason |
| 3,792,327 A | | 2/1974 | Waldorf |
| 4,193,271 A | | 3/1980 | Honigsbaum |
| 4,271,677 A | | 6/1981 | Harr |
| 4,280,330 A | | 7/1981 | Vardell |
| 4,438,342 A | | 3/1984 | Kenyon |
| 4,448,157 A | | 5/1984 | Eckstein |
| 4,461,988 A | | 7/1984 | Plunkett |
| 4,470,476 A | | 9/1984 | Hunt |
| 4,658,599 A | | 4/1987 | Kajiwara |
| 4,711,204 A | | 12/1987 | Rusconi |
| 4,712,636 A | | 12/1987 | Ishimatsu |
| 4,732,229 A | | 3/1988 | Lucht |
| 4,825,663 A | | 5/1989 | Nijjar et al. |
| 4,828,452 A | | 5/1989 | Bolitho |
| 4,846,327 A | | 7/1989 | Mayer |
| 4,947,657 A | * | 8/1990 | Kalmbach ................ 62/236 |
| 4,976,114 A | * | 12/1990 | Manning ................ 62/323.1 |
| RE33,687 E | | 9/1991 | Greer |
| 5,046,326 A | | 9/1991 | Havemann et al. |
| 5,048,657 A | | 9/1991 | Dissett et al. |
| 5,190,118 A | | 3/1993 | Yelton |
| 5,255,733 A | | 10/1993 | King |
| 5,267,635 A | | 12/1993 | Peterson et al. |
| 5,307,645 A | | 5/1994 | Pannell |
| 5,346,031 A | | 9/1994 | Gardner |
| 5,522,778 A | | 6/1996 | Iwase et al. |
| 5,558,588 A | | 9/1996 | Schmidt |
| 5,637,987 A | | 6/1997 | Fattic et al. |
| 5,669,842 A | | 9/1997 | Schmidt |
| 5,755,303 A | | 5/1998 | Yamamoto |
| 5,773,904 A | | 6/1998 | Schiebold et al. |
| 5,799,632 A | | 9/1998 | Bennett |
| 5,799,744 A | | 9/1998 | Yamaguchi |
| 5,806,617 A | | 9/1998 | Yamaguchi |
| 5,810,321 A | * | 9/1998 | Presson ................ 248/674 |
| 5,845,731 A | | 12/1998 | Buglione |
| 5,862,497 A | | 1/1999 | Yano |
| 5,881,564 A | * | 3/1999 | Kishimoto et al. ........... 62/193 |
| 5,887,670 A | | 3/1999 | Tabata |
| 5,896,750 A | | 4/1999 | Karl |
| 5,942,879 A | | 8/1999 | Ibaraki |
| 6,038,877 A | | 3/2000 | Peiffer et al. |
| 6,059,059 A | | 5/2000 | Schmidt-Brucken |
| 6,080,081 A | | 6/2000 | Sauermann et al. |
| 6,138,788 A | | 10/2000 | Bohner et al. |
| 6,151,891 A | | 11/2000 | Bennett |
| 6,155,364 A | | 12/2000 | Nagano et al. |
| 6,209,672 B1 | | 4/2001 | Severinsky |
| 6,269,713 B1 | | 8/2001 | Ohke |
| 6,276,161 B1 | | 8/2001 | Peiffer et al. |
| 6,340,339 B1 | | 1/2002 | Tabata et al. |
| 6,405,818 B1 | | 6/2002 | Anthony |
| 6,427,100 B1 | | 7/2002 | Kaku |
| 6,488,345 B1 | | 12/2002 | Woody et al. |
| 6,651,759 B1 | | 11/2003 | Gruenwald et al. |
| 6,692,403 B2 | | 2/2004 | Charaudeau et al. |
| 6,796,367 B2 | * | 9/2004 | Blacquiere et al. ........... 165/41 |
| 6,851,470 B2 | | 2/2005 | Laukhuf |
| 6,862,511 B1 | | 3/2005 | Phillips et al. |
| 6,907,337 B2 | | 6/2005 | Phillips et al. |
| 6,915,198 B2 | | 7/2005 | Phillips et al. |
| 6,966,868 B2 | | 11/2005 | Stork et al. |
| 6,986,645 B2 | * | 1/2006 | Iwanami et al. ............... 417/16 |
| 6,998,727 B2 | | 2/2006 | Gray |
| 7,004,273 B1 | | 2/2006 | Gruenwald |
| 7,021,409 B2 | | 4/2006 | Tamor |
| 7,035,727 B2 | | 4/2006 | De La Salle et al. |
| 7,055,337 B2 | * | 6/2006 | Horn et al. ................ 62/199 |
| 7,091,839 B2 | | 8/2006 | Situ et al. |
| 7,102,313 B2 | | 9/2006 | Kadota |
| 7,104,920 B2 | | 9/2006 | Beaty et al. |
| 7,107,776 B2 | * | 9/2006 | Ikura et al. ................ 62/196.2 |
| 2003/0062205 A1 | | 4/2003 | Konrad et al. |
| 2004/0157704 A1 | | 8/2004 | Stork et al. |
| 2004/0200648 A1 | | 10/2004 | Tarasinski et al. |
| 2005/0060076 A1 | | 3/2005 | Phillips et al. |
| 2005/0060079 A1 | | 3/2005 | Phillips et al. |
| 2005/0060080 A1 | | 3/2005 | Phillips et al. |
| 2005/0113202 A1 | | 5/2005 | Miller et al. |
| 2005/0211479 A1 | | 9/2005 | Tamor |
| 2005/0224264 A1 | | 10/2005 | Perrin |
| 2006/0108161 A1 | | 5/2006 | Feliss et al. |
| 2006/0207274 A1 | | 9/2006 | Harris |
| 2006/0258505 A1 | | 11/2006 | Vafidis |
| 2007/0124037 A1 | | 5/2007 | Moran |
| 2007/0181355 A1 | | 8/2007 | Harris |
| 2009/0018716 A1 | | 1/2009 | Ambrosio |

FOREIGN PATENT DOCUMENTS

| | | |
|---|---|---|
| EP | 078474381 | 5/2003 |
| JP | 07-195955 | 8/1995 |
| JP | 11-146502 | 5/1999 |
| JP | 2004-236609 | 8/2004 |
| WO | 2004062957 | 7/2004 |
| WO | 2005003600 | 1/2005 |
| WO | WO2006038968 | 4/2006 |
| WO | 2007030069 | 3/2007 |
| WO | WO 2007/097819 | 8/2007 |

OTHER PUBLICATIONS

Southwest Research Institute, "Fuel cell-assisted truck completes cross-country trek." http://www.swri.org/9what/releases/2005/FuelCell.htm, May 26, 2005. SwRI, San Antonio, TX.

Brodrick et al. "Demonstration of a Proton Exchange Membrane Fuel Cell as an Auxiliary Power Source for Heavy Trucks." SAE Transactions, 2000, vol. 109, pp. 783-788 NY, NY.

International Search Report dated Mar. 20, 2008; Application No. PCT/US06/60833, 10 pages.

"Power Take-Offs"; http://www.gears-manufacturers.com/power-take-offs.html; 3 pages.

\* cited by examiner

901 HEAT EXCHANGER
902 EXCHANGER FAN
903 CONNECTOR
904 TUBING
905 MOUNTING BRACKETS FAN
906 MOUNTING BRACKETS EXCHANGER
907 DELTA PRESSURE BLADES
908 DELTA PRESSURE BLADES DRIVER
909 TEMPERATURE LEVEL SWITCH
910 ELECTRICAL WIRE
911 ELECTRICAL CONNECTOR

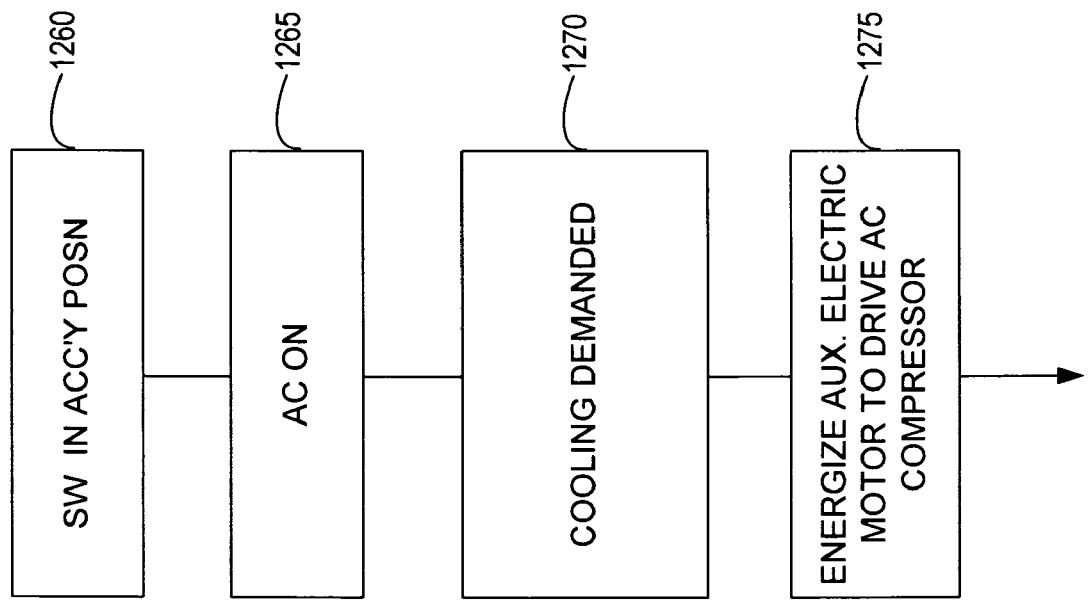

METHOD AND AUXILIARY SYSTEM FOR OPERATING A COMFORT SUBSYSTEM FOR A VEHICLE

CROSS-REFERENCE TO RELATED CASE

This patent application is related to, and claims the benefit of the priority date of, U.S. provisional patent application 60/661,668, which was filed on Mar. 14, 2005 and is hereby incorporated herein by reference.

BACKGROUND

1. Field of the Invention

The present invention concerns auxiliary systems for vehicles, especially, but not necessarily limited to, line-haul trucks, and more particularly concerns auxiliary power, heating and cooling.

2. Background Art

A large truck, and especially a class 7 or 8 line-haul truck, conventionally has a main traction engine, typically diesel, for powering a main traction load and also an auxiliary system load, which may include radio, warning light, and driver and sleeper heating and cooling systems. The auxiliary systems load may also include convenience loads, such as a television, a DVD player, a sound system and a computer system, which may be used during rest intervals when the truck is stopped or while waiting in line for loading or unloading.

It is problematic to use the main engine to power auxiliary loads when it is not needed for the traction load. The main engine is much bigger than necessary merely for auxiliary loads. Besides being an inefficient use of fuel, the main engine also emits more combustion byproducts than is ideal for the smaller, auxiliary load. Various attempts have been made to address this problem. However, each approach that has been developed has some disadvantage.

One solution has been to provide a battery-powered auxiliary power system on a line-haul truck. As bad as it may seem to use the main engine merely for auxiliary loads during long rests and while waiting, it may be even worse to depend solely on a battery-powered auxiliary power system. For one thing, this gives rise to a risk that the battery will run down while the main engine is shut down. If this happens, it requires an external source to jump start the truck, which can be expensive and time consuming. In addition, the auxiliary comfort air conditioning system conventionally includes a compressor that is linked to and driven by the main engine. Therefore, in order to supply auxiliary loads by a battery-powered auxiliary power system it is conventional to also provide an auxiliary heating ventilating and air conditioning system that is independent of the heating and cooling systems driven by the main engine. This adds additional weight, complexity and possible inefficiency. Also, in order to power auxiliary loads by an unassisted, battery-powered electrical system, a large, heavy battery is required. This poses additional inefficiency and expense.

In certain situations, such as at truck stops, external electrical auxiliary power and even external air conditioning may be supplied so that a self-sufficient battery-powered system is not required. However, truck stops are not always available. And even when a truck stop is available, there may not always be sufficient hook ups to electrical power or air conditioning for meeting demand.

Another solution that has been tried is to provide some other power source on a line-haul truck for the auxiliary system load, such as a small, independent internal combustion engine. This does reduce emission of combustion byproducts, but ideally such emissions would be zero for the auxiliary systems load during main engine shutdown. Moreover, an arrangement that uses a small internal combustion engine for auxiliary power, like the arrangement of the battery-powered auxiliary power unit, ordinarily includes an independent, auxiliary heating ventilating and air conditioning system, or else the heating ventilating and air conditioning system may not be available at all during rests or while waiting with the main engine shut down.

Another approach has been to replace the truck battery with a compressed air tank and an auxiliary internal combustion engine that drives an auxiliary air compressor, an auxiliary water pump, and auxiliary AC compressor/heat exchanger pump, and also to replace the main engine electric starter with a pneumatic main engine starting system. Guy Willis, "Small Compact Auxiliary Power System for Heavy Duty Diesel Engine," EP 0784743B1, May 21, 2003. This provides redundancy for part of the comfort air conditioning system rather than for the entire system. That is, according to Willis two compressors are installed in the same refrigerant loop, where one compressor is driven by the main traction engine and the other is driven by the auxiliary internal combustion engine. Again, using a smaller internal combustion engine for air conditioning during main engine shut down reduces emission of combustion byproducts, but such emissions would ideally be zero for the auxiliary systems load during main engine shutdown. Also, Willis does not disclose how two components of an air conditioning/heat pump system are operated when the main engine is shut down. That is, Willis does not address operation of the air blower that delivers warm or cold air to the cab of the truck, nor the heat exchanger air blower for the air conditioning/heat pump system.

Alternatively, two AC compressors have been installed in independent refrigerant loops, but with a shared evaporator air flow system. Giorgio Moffa, "Air-conditioning System for Motor Vehicles, with Two Sparate and Independent Refrigerating Circuits . . . , " EP1140533B1, Jan. 22, 2003 ("Moffa"), paragraphs 7-8. This gives rise to some of the same questions and issues suggested by Willis.

Yet another approach has been to provide redundancy for only the drivers of the AC compressor. It is not clear whether Moffa mentions this approach in passing. See Moffa, paragraph 2 (describing an AC compressor receiving power from the main engine or from other sources, but not clearly stating whether these are mutually exclusive arrangements or whether the sources are redundant). Further, even if Moffa is alluding to driver redundancy, he does not disclose how such redundancy is achieved. Some mechanism for driver redundancy has been described elsewhere. Shane Blacquiere et al., "Vehicle Battery Charging and Air Conditioning Operating Unit," U.S. Pat. No. 6,796,367B2, Sep. 28, 2004. However, in the arrangement disclosed by Blackquire et al., a second pulley is merely bolted to the shaft of an AC compressor for connecting a belt to a second driver. Id., FIG. 5. This arrangement may have disadvantages for long-term service.

In another development, a line-haul truck equipped with a fuel cell was shown in May, 2005, at the U.S. Fuel Cell Council's Congressional Fuel Cell Exposition in or near Washington, D.C. News release from Southwest Research Institute, "Fuel cell-assisted truck completes cross-country trek," May 26, 2005, http://swri.org/9what/releases/2005/FuelCell.htm. This was for an experimental demonstration of fuel efficiency. Id. Some time shortly before or after this Exposition, the truck was driven from California to Virginia. Id. The inventor of the subject matter of the present patent application inspected the truck in California. Certain of the following observations are based on personal knowledge.

The fuel cell for the demonstration truck was rigidly mounted to the chassis of the line-haul tractor. The cost and durability of current fuels cell may not be adequate for long-term, repeated use in the same manner as the fuel cell system was arranged for the demonstration. Current day fuel cells that are widely available include closely spaced, parallel separator plates of graphite or metal coated with gold to prevent reduction of the plates during operation and are fed by hydrogen gas, which is highly volatile. It presents a challenge to adequately secure such an expensive device in this service while at the same time adequately isolating the device from ordinary bumps and jerks encountered in day-to-day operation of a line-haul truck.

Also, the demonstration truck was converted in such a fashion that non-traction loads, which are conventionally supplied while a truck is in motion by the truck's main traction engine, were supplied directly or indirectly by a fuel cell. These included loads such as an air compressor, fuel, water and oil pumps, and radiator fan for processes that are required for braking or in order for the main engine to drive the traction load. Other non-traction loads were for air conditioning ("AC"). This was an extensive conversion and was expensive. For the thousands of line-haul trucks currently in service, it would not be practical to undertake these particular conversions in order to supply some non-traction loads by a fuel cell. For one thing, according to this conversion, the fuel cell operates full time, instead of just at rest stops and while waiting. This tends to use up the life of the fuel cell, which is an expensive device. It also requires a larger supply of fuel for the fuel cell. Also, this particular conversion requires that individual new electric drivers be provided for some of the loads, which is an added expense that would ideally be avoided.

Another issue with the demonstration conversion concerns a belt-drive arrangement on conventional line-haul trucks. That is, the AC compressor, engine cooling water pump and engine cooling fan on such a truck are conventionally driven by the main traction engine via a serpentine belt routed around pulleys on the shafts of the AC compressor, cooling water pump and radiator fan. According to the conversion undertaken for this demonstration, some of loads were driven, via one or more new belts, by a relatively large electric motor. Aside from being an expensive and time consuming modification, this belt arrangement, as well as other modifications performed in this demonstration truck conversion, might have implications with regard to the truck manufacturer's warranty.

Thus, despite all the above attempted innovations, in order to power auxiliary loads on a line-haul truck it is still a common practice to keep the main engine running during rests and while waiting. For this reason, a need still exists for an improved method and apparatus for providing auxiliary power to a large truck.

SUMMARY OF THE INVENTION

The foregoing need is addressed in the present invention. According to one form of the invention, an auxiliary system is provided for supplying air conditioning to the cabin of a truck. The system includes an air conditioning compressor having a jackshaft mounted on a hub of the compressor. The system further includes an electric motor connected to the jackshaft by a belt for the motor, wherein the electric motor has a drive shaft and a pulley rigidly secured thereon, i.e., with no clutch and with no provision for slippage of the pulley relative to the drive shaft. The jackshaft has a pulley thereon for the electric motor drive. An end of the jackshaft that is not proximate to the compressor is rotatably held by a bearing and a bearing bracket in order to increase capability of the jackshaft to withstand side loading.

Variations, objects, advantages, and forms of the invention will become apparent upon reading the following detailed description and upon reference to the accompanying drawings.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

In the following detailed description of the preferred embodiments, reference is made to the accompanying drawings illustrating embodiments in which the invention may be practiced. It should be understood that other embodiments may be utilized and changes may be made without departing from the scope of the present invention. The drawings and detailed description are not intended to limit the invention to the particular form disclosed. On the contrary, the intention is to cover all modifications, equivalents and alternatives falling within the spirit and scope of the present invention as defined by the appended claims. Headings herein are not intended to limit the subject matter in any way.

General Overview

Figure 1A:
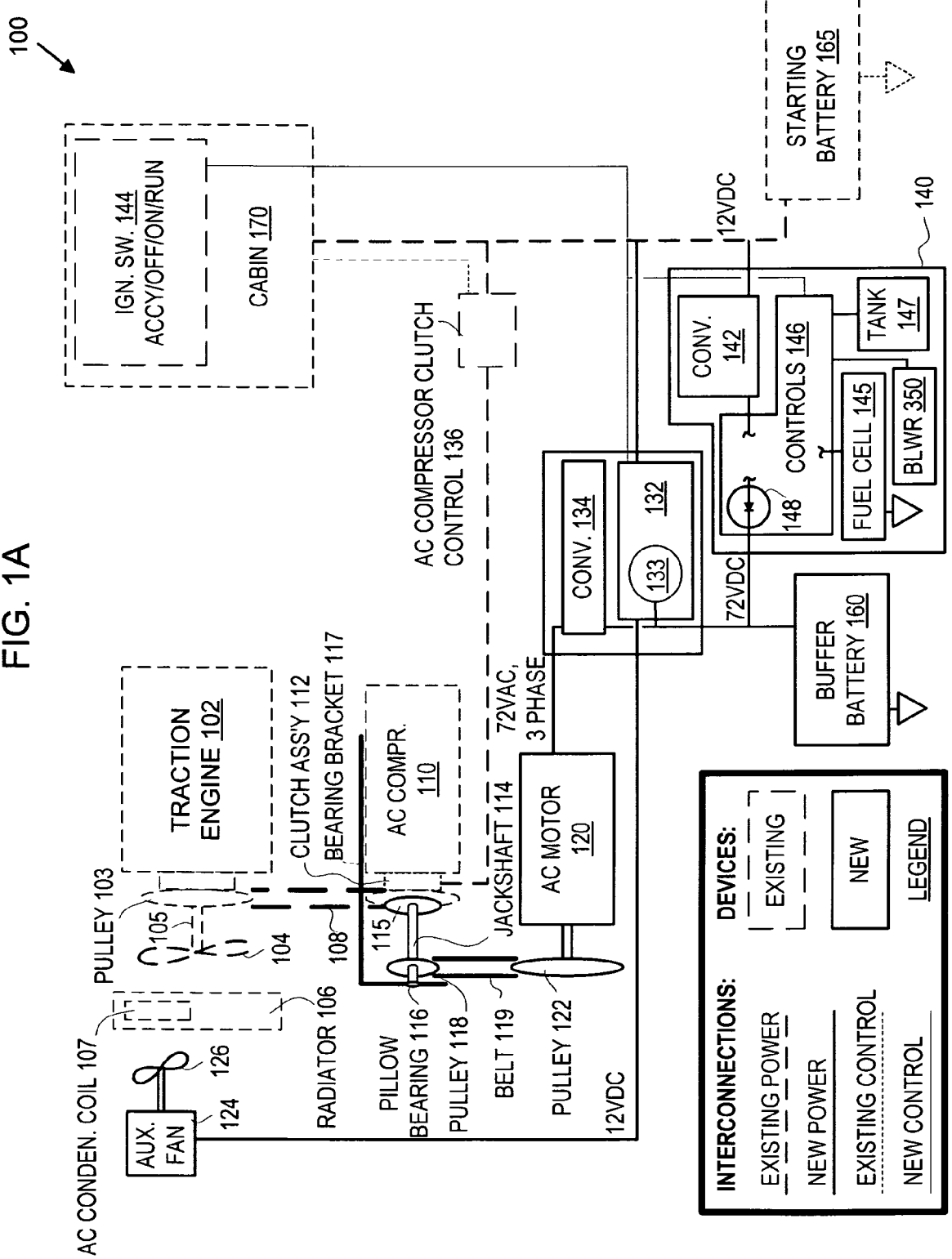
FIG. 1A illustrates an auxiliary system having an auxiliary electric motor that drives an air conditioning compressor, wherein the electric motor has no clutch, according to an embodiment of the present invention.

Referring now to FIG. 1A, a block diagram is shown for an auxiliary system 100, according to an embodiment of the present invention. In FIG. 1A, devices conventionally included in a line-haul truck are shown with dashed lines. These include a traction engine 102 with a pulley 103 and fan 104 coupled to a shaft 105 affixed to and rotated by engine 102 when engine 102 is running. When engine 102 is running it conventionally rotates fan 104 via shaft 105 to blow air through, and thereby cool, engine 102 cooling water forced through radiator 106 by a cooling water pump (not shown). The air also cools an AC condenser 107 which has coolant forced through it by an AC compressor 110.

Conventional devices also include a serpentine belt 108 that couples shaft 105 to an electromagnetic clutch assembly 112 mounted on a drive shaft (not shown) of AC compressor 110 in order to rotate the shaft of AC compressor 110 and thereby force the coolant through an evaporator (not shown) in the cab 170 of the truck, as well as through condenser 107, for cooling the interior of cab 170.

Conventionally, an AC compressor clutch control device 136 is operable to selectively cause the clutch assembly 112 to rigidly connect a pulley of assembly 112 indirectly with the drive shaft AC compressor 110, or else to indirectly disconnect the pulley from the drive shaft, as will be further explained herein below with reference to FIG. 2. Thus, when the pulley of assembly 112 and drive shaft of AC compressor 110 are rigidly connected, traction engine 102 turns the drive shaft of AC compressor 110 via belt 108 and pulley 103. But if the pulley of assembly 112 is disconnected from the shaft of AC compressor 110, the pulley of assembly 112 may turn freely even though engine 102 is running.

Conventionally, power to operate the electromagnetic clutch of assembly 112 is fed to AC compressor clutch control device 136 from a 12 Volt electrical system that includes a starting battery 165, which is recharged by an alternator (not shown) that is rotated by engine 102 via the same serpentine belt 108. AC compressor clutch control device 136 is conventionally wired to, and thereby receives signals from, devices in the truck cabin 170, including an on/off switch (not shown) for air conditioning control and a thermostat (not shown) that senses temperature in the cabin.

In FIG. 1A, devices shown with solid lines have been added to the conventional devices of a line-haul truck. These devices shown with solid lines are included in the auxiliary system 100 of the illustrated embodiment of the present invention. Among other things, these devices of auxiliary system 100 enable cooling of cabin 170 and recharging of battery 165 during traction engine 102 shut down, as follows.

Jackshaft Connected to Hub of AC Compressor Clutch

According to the illustrated embodiment of auxiliary system 100, a flange 115 is securely mounted on a hub of a pulley of assembly 112. Flange 115 has a jackshaft 114 securely fixed thereto and in alignment with the drive shaft (not shown) of AC compressor 110.

Figure 1B:
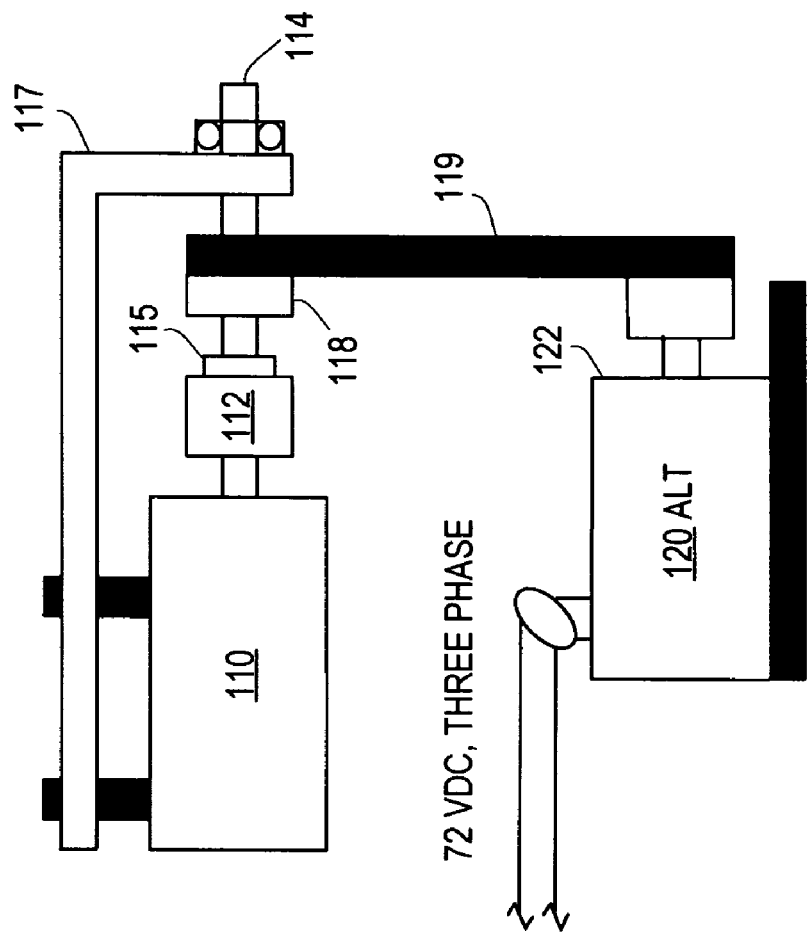
FIG. 1B illustrates an auxiliary system having an auxiliary electric motor that drives an air conditioning compressor, wherein the electric motor does have a clutch, according to an embodiment of the present invention.
Figure 2:
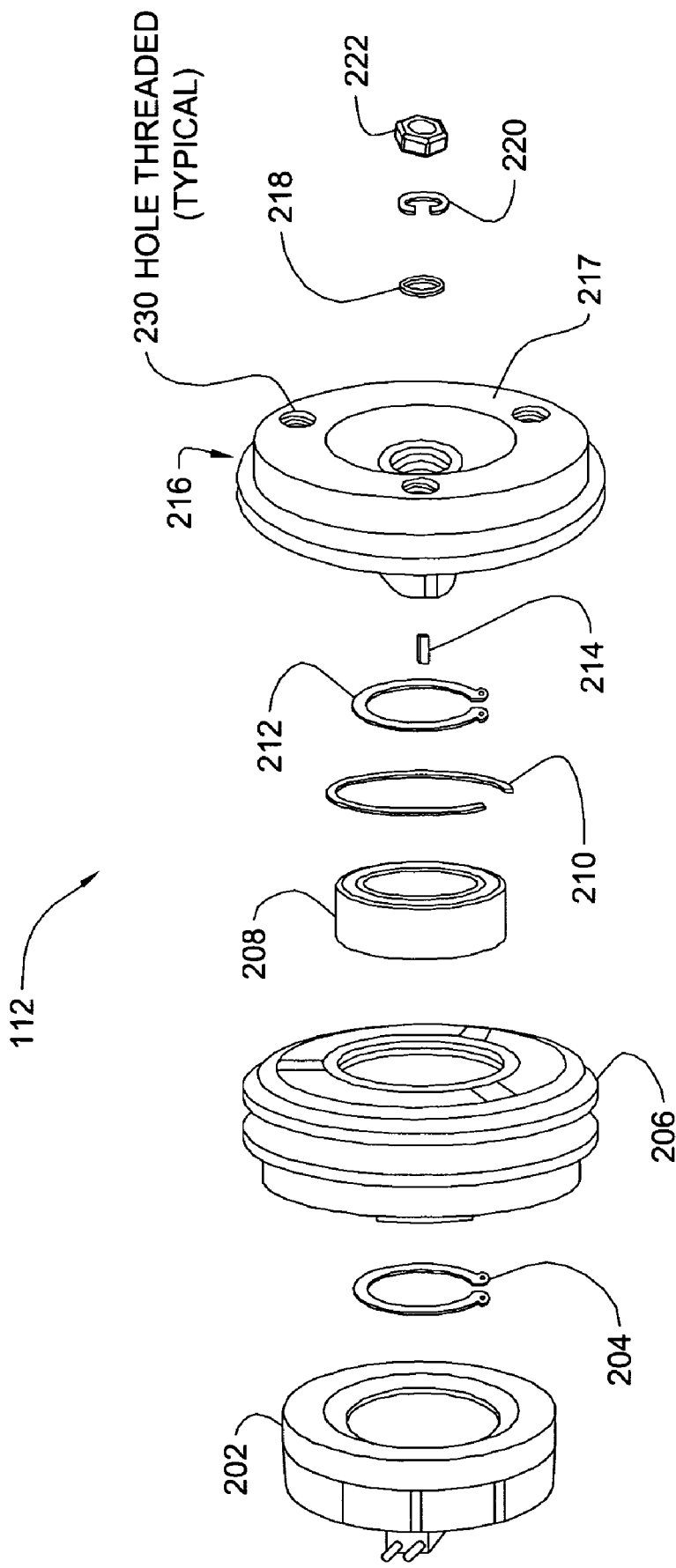
FIG. 2 pictorially illustrates a prior art clutch assembly that may be used for the air conditioning compressor in FIGS. 1A and 1B.

Referring to FIG. 2, certain details of a prior art clutch assembly are illustrated. The clutch assembly of FIG. 2 is suitable for use as the clutch assembly 112 in the embodiment of the present invention shown in FIGS. 1A and 1B and is labeled accordingly. Clutch assembly 112 includes pulley 206 for mounting on bearing 208, which, in turn, is mounted on a drive shaft (not shown) such as that AC compressor 110 (FIGS. 1A and 1B). In this manner, bearing 208 enables pulley 206 to be driven by a drive belt, such as belt 108 (FIG. 1A), and thereby rotate on the drive shaft with a minimum of friction Assembly 112 of FIG. 2 also includes an electromagnetic coil 202. When coil 202 is electrically energized it produces a force causing a portion of the interior face of hub 216 to engage pulley 206. Hub 206 is conventionally rigidly fixed by shaft key 214 to the drive shaft, so that when coil 202 causes hub 216 to engage pulley 206 this indirectly connects the drive shaft of AC compressor 110 rigidly to pulley 206 so that belt 108 may transfer rotational force from traction engine 102 (FIG. 1A) to the compressor 110 drive shaft.

Referring now also to FIG. 1A in conjunction with FIG. 2, flange 115 of jackshaft 114 is securely mounted on exterior face 217 of hub 206, according to the illustrated embodiment of the present invention. In this manner, the drive shaft of AC compressor 110 may also be driven by jackshaft 114.

Pictorial Figures of Connections and Components

Figure 10A:
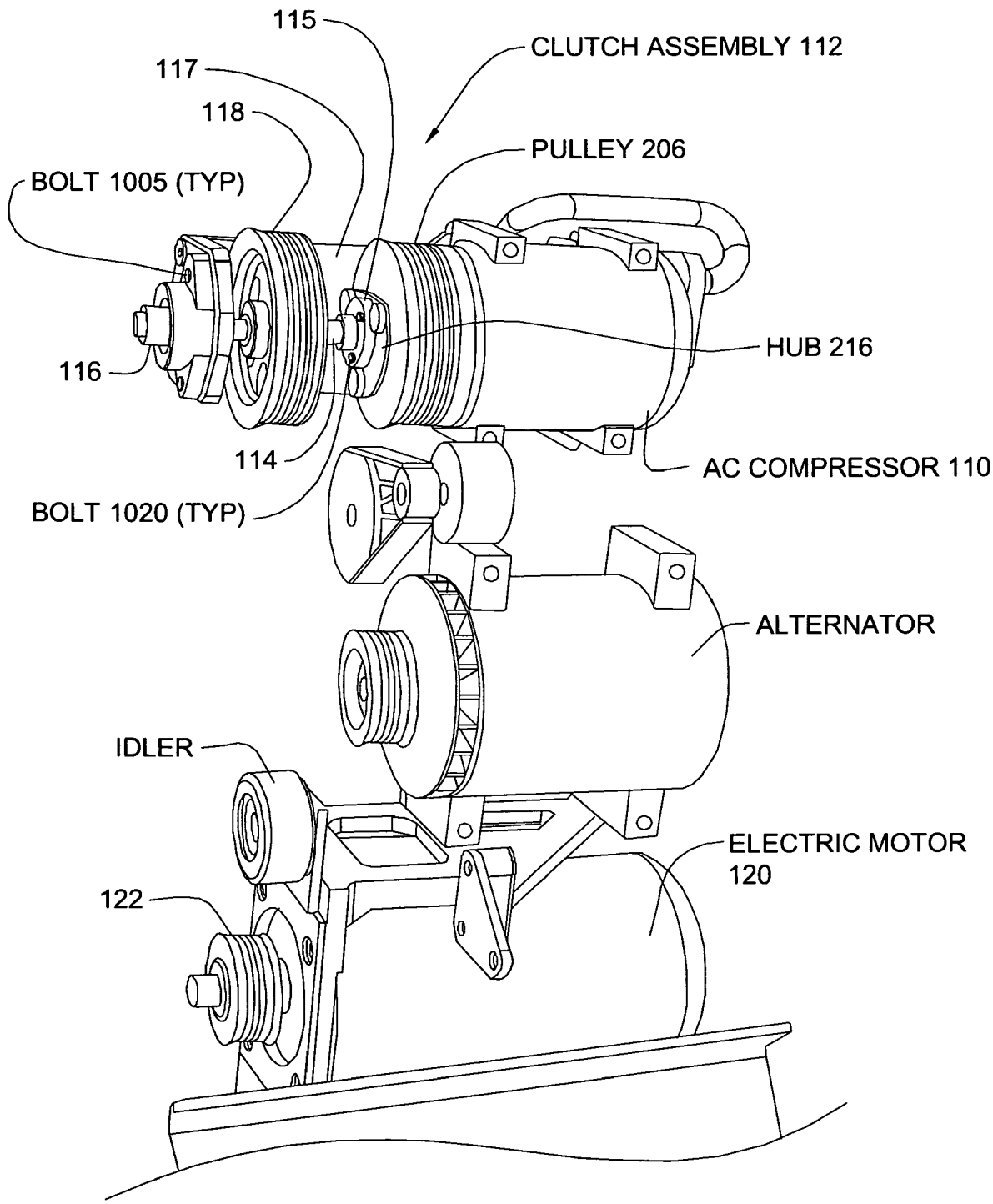
FIGS. 10A, 10B and 10C pictorially illustrate mechanical connection of the electric motor and an air conditioning compressor and components of the connection, wherein the connection does not have a clutch for the electric motor, according to an embodiment of the present invention.
Figure 10B:
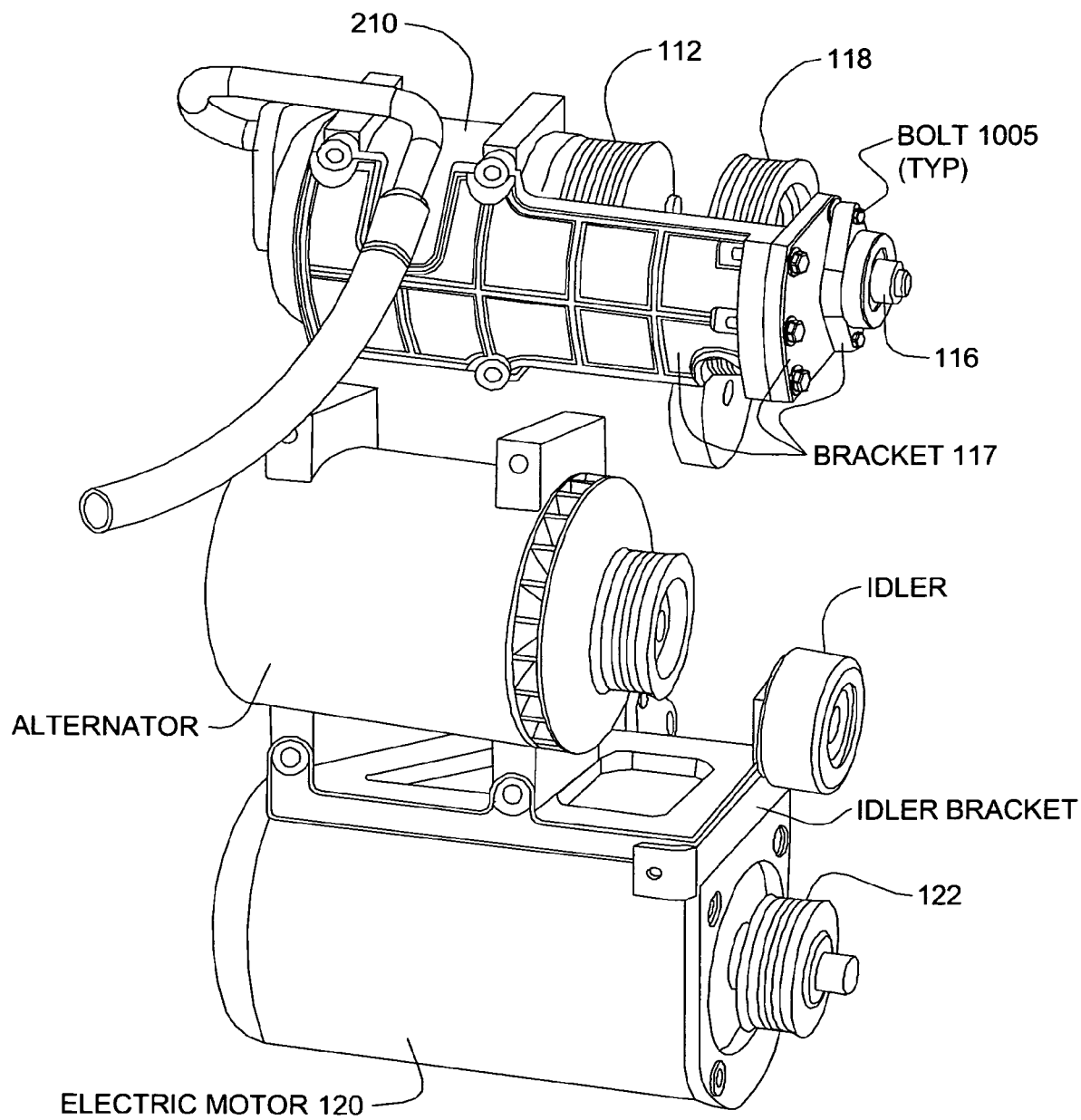
Figure 10C:
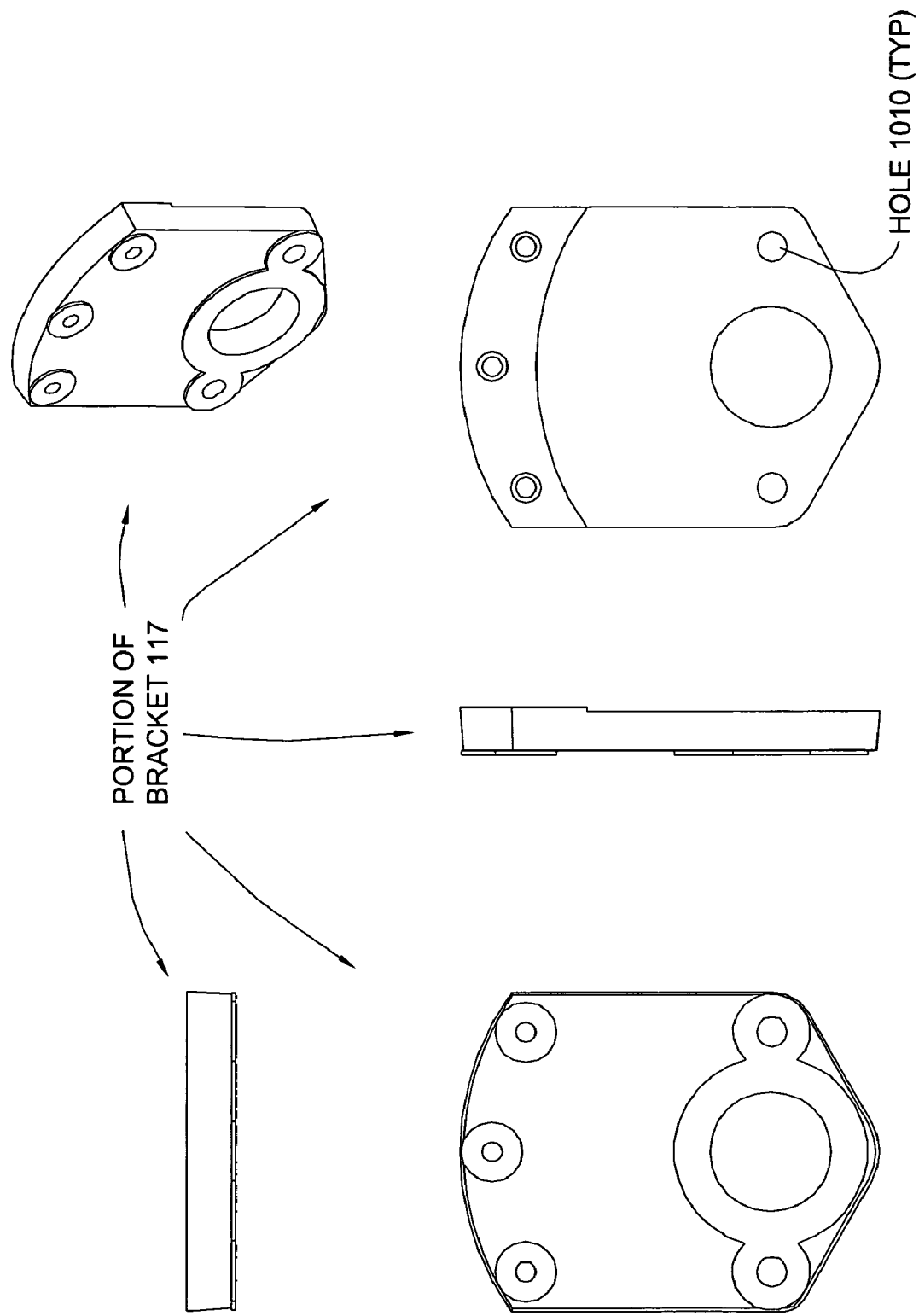

Referring now to FIGS. 10A, 10B and 10C, mechanical connection of the electric motor and an air conditioning compressor and components of the connection are pictorially illustrated, wherein the connection does not have a clutch for the electric motor, according to an embodiment of the present invention. Flange 115 is securely mounted on hub 216 of pulley 206 of assembly 112. Flange 115 has a jackshaft 114 securely fixed thereto and in alignment with the drive shaft (not shown) of AC compressor 110. Flange 115 of jackshaft 114 is securely mounted on hub 206 by bolts 1020 (FIG. 10A). In this manner, the drive shaft of AC compressor 110 may also be driven by jackshaft 114.

On jackshaft 114 is another pulley 118, securely and rigidly mounted to jackshaft 114 in such a manner that rotational force on pulley 118 is imparted to jackshaft 114. A distal end of jackshaft 114, i.e., an end some distance from flange 115, is rotatably secured by a bearing 116 mounted on a bracket 117, which is, in turn, mounted on AC compressor 110. (In an alternative embodiment, bracket 117 may be mounted on a bracket (not shown) that holds AC compressor 110, instead of being mounted directly on compressor 110 itself.) Bracket 117 includes means for adjusting the position of bearing 116 and distal end of jackshaft 114 relative to the shaft (not shown) of compressor 110. Likewise, flange 115 includes means for adjusting the position of proximal end of shaft 114 relative to the shaft of compressor 110. These adjusting means facilitate the alignment of jackshaft 114 with the shaft of AC compressor 110, so as to reduce rotational runout of jackshaft 114 that may arise responsive to rotation of the shaft of AC compressor 110. In the illustrated embodiment, the adjusting means for both bracket 117 and jackshaft 114 flange 115 are merely slightly oversized holes for receiving bolts. In the case of bracket 117, holes 1010 are for receiving bolts 1005 to secure pillow bearing 116 and are oversized such that about there is about 0.001 inch lateral adjustment available for positioning of bearing 116. Regarding adjustment of jackshaft 114 by means of holes in flange 115, see FIG. 11, described herein below.

Pulley 118 is coupled by a belt 119 (not shown in FIGS. 10a-10C) to a pulley 122 securely mounted on a shaft of three-phase AC motor 120 such that rotation of the shaft of AC motor 120 translates rotation to pulley 118 via pulley 122 and belt 119. Thus, rotation of the shaft of AC motor 120 translates to rotation of jackshaft 114. Consequently, if AC motor 120 is electrically energized, the resulting rotation of the shaft of AC motor 120 translates rotation to the drive shaft of AC compressor 110.

Jackshaft

Figure 11:
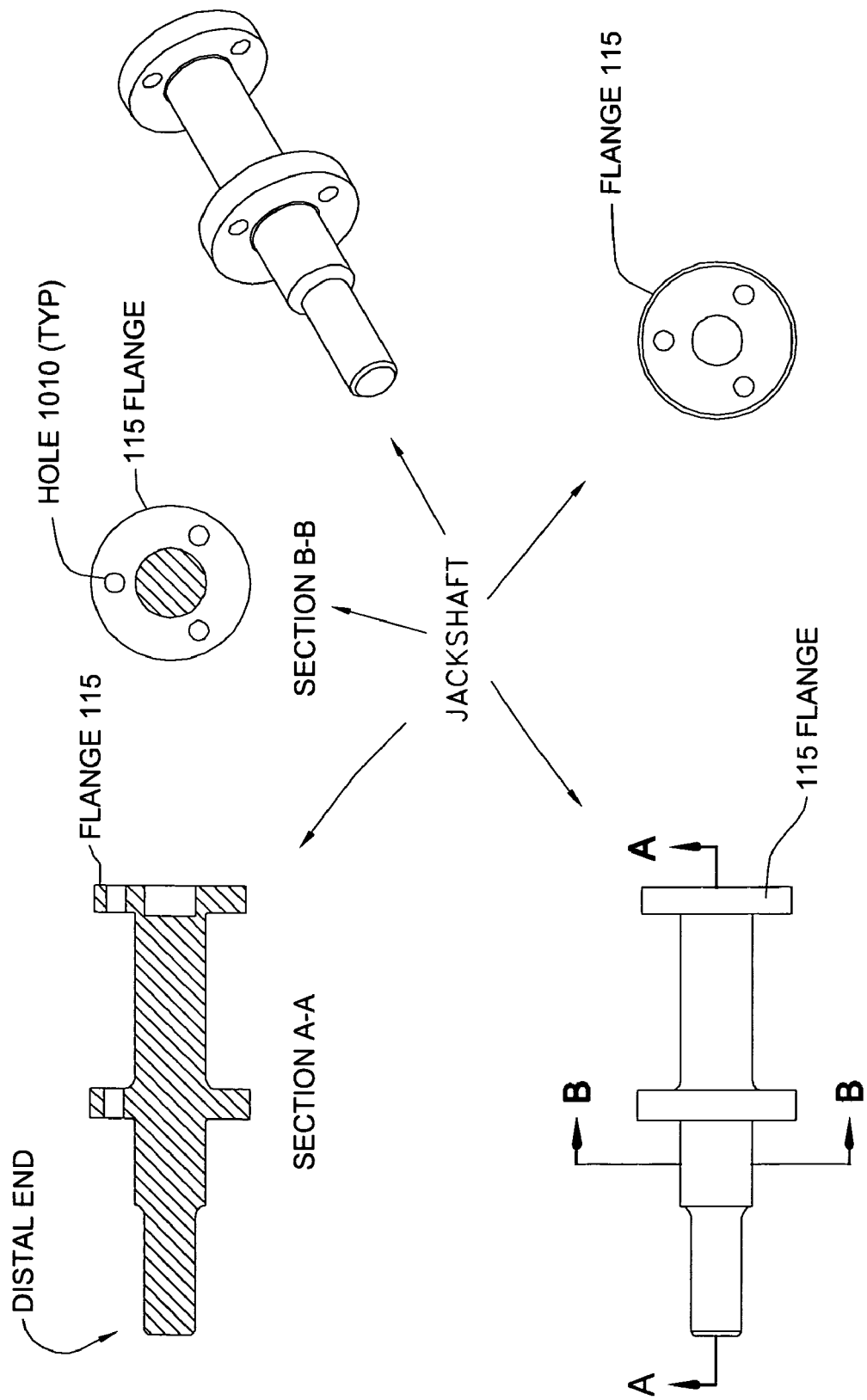
FIG. 11 illustrates the jackshaft shown in FIGS. 10A and 10B.

Referring now to FIG. 11, jackshaft 114 is illustrated in various orthographic views, according to an embodiment of the present invention. In the embodiment of FIG. 11, flange 115 is included as an integral part of jackshaft 114. Flange 115 has holes 1110 that are positioned to match threaded holes 230 in hub 216 (FIG. 2) and are slightly oversized such that about there is about 0.001 inch lateral adjustment available for positioning of jackshaft 115.

No Clutch for Electric Motor Coupled to Jackshaft

Note that when traction engine 102 is running it continually turns pulley 206. Note also, there is no clutch for motor 120 in the embodiment of the invention shown in FIG. 1A. Thus, if the clutch of assembly 112 for AC compressor 110 is activated to rigidly connect pulley 206 with the compressor 110 drive shaft the turning of pulley 206 by engine 102 will turn the shaft of motor 120. It is essential, therefore, that for the embodiment of the invention shown in FIG. 1A motor 120 must be de-energized when traction engine 102 is running. Further implications of this issue will be discussed herein below. However, the rest of FIG. 1A will first be described prior to taking up that issue.

Auxiliary Power Unit

Auxiliary power unit 140 includes hydrogen and air input connections coupled to corresponding inputs of a 72 VDC 5 KW output of hydrogen fuel cell (which may also be referred to herein as "HFC") 145, the hydrogen connection being coupled by tubing via controls 146 to a hydrogen reservoir 147. Fuel cell 145 has two output electrodes, one grounded and one coupled to the anode of a diode 148 and to the input of a 72 VDC to 12 VDC converter 142.

Figure 3:
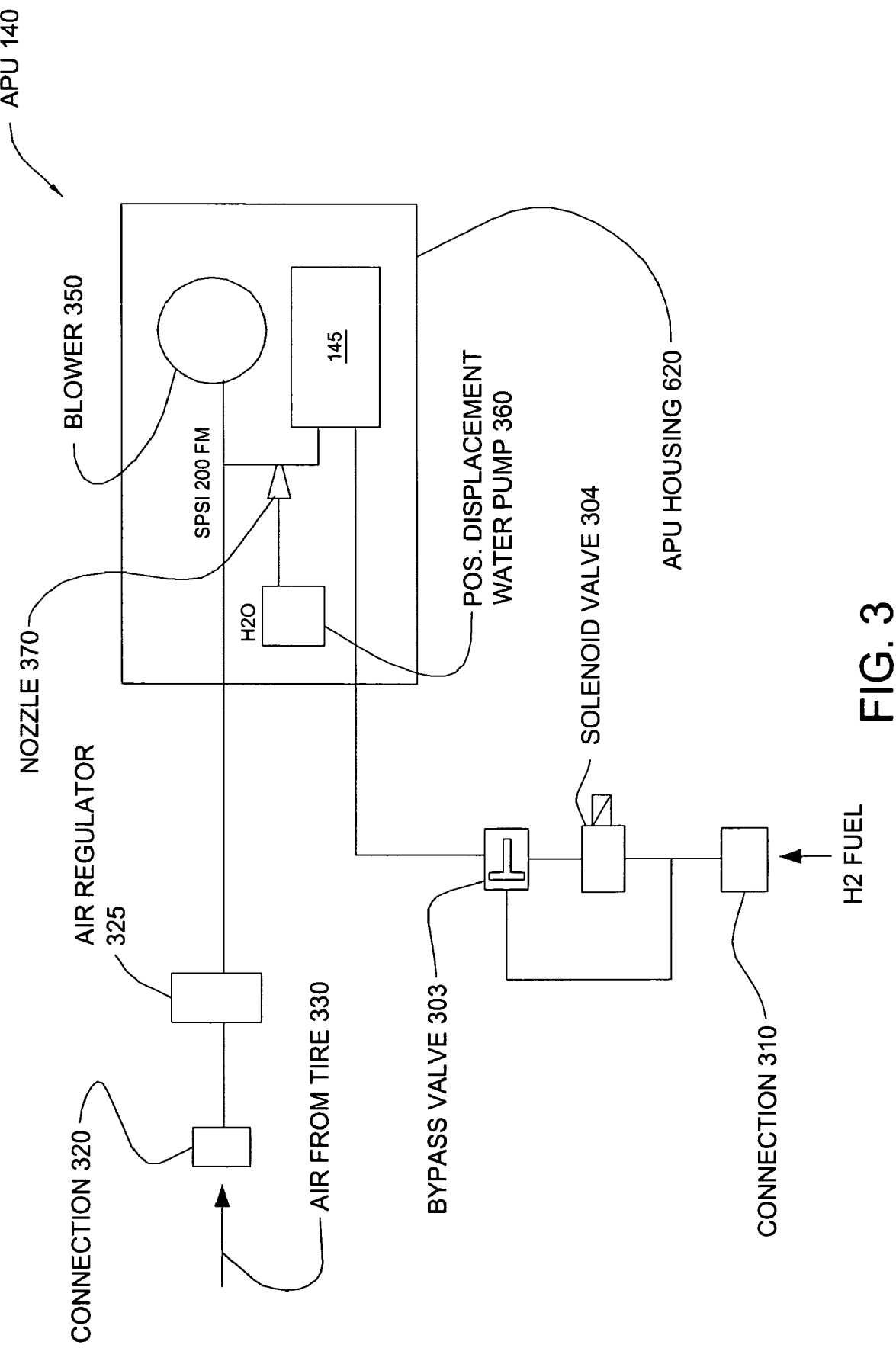
FIG. 3 illustrates the feed system for a hydrogen fuel cell in an auxiliary system such as that of FIGS. 1A and 1B, according to an embodiment of the present invention.

Referring now to FIG. 3, certain additional details are shown of controls 146 for connections to auxiliary power unit ("APU") 140. Controls 146 include fail-closed electromagnetic-solenoid-operated shutoff valve 304 coupled via tubing connection 310 to hydrogen fuel tank 147 (FIG. 1) for supplying hydrogen to fuel cell 145 (FIG. 1A) of APU 140, which is mounted in APU housing 620. A manually-operated bypass valve 303 has a first port connected in series with electromagnetic valve 304 and a second port connected to the hydrogen fuel cell 145 via hydrogen fuel supply tubing. Valve 303 has a third port coupled to a tubing path bypassing electromagnetic valve 304. Valve 303 is spring-loaded to return to a normal position in which it permits flow between its first and second ports and shuts off any flow from its third port. Responsive to a person actuating valve 303 by moving an actuator connected to the spring-loaded valve stem, thereby putting valve 303 in a bypass position, valve 303 permits flow between its send and third ports and shuts off flow from its first port. Thus, with valve 303 connected as shown and in the normal position, hydrogen may flow through its first and second ports to HFC 145 via valve 304 and the hydrogen fuel supply tubing. In the manually actuated, bypass position of valve 303, hydrogen may flow through the second and third ports to HFC 145 via the hydrogen fuel supply tubing, bypassing automatic solenoid valve 304.

Fuel cell 145 in APU 140 is also connected to receive air from a blower 350, which is part of a so-called "hotel" load as will be explained herein below. Hydrogen fuel cells such as fuel cell 145 require not only a hydrogen feed and an air feed, but also that the air be humidified. According to the embodiment of the present invention illustrated in FIG. 3, this humidification is provided for a 5 KW base load on the fuel cell by a ten watt positive displacement pump 360 that is part of the hotel load of HFC 145. Pump 360 forces water at a rate of about one liter per hour and 70 psi through a 10 micron nozzle 370 connected right at the air inlet of fuel cell 145, down stream from blower 350. Nozzle 370 thus atomizes and injects a water mist into the air flow from blower 350 into fuel cell 145. This arrangement uses less energy than conventional alternatives, such as humidification by heating water or forcing air through water baffles, and thereby increases efficiency of fuel cell 145. Moreover, this method is more easily controlled by adjustment of the positive displacement pump 360 stroke. If necessary, nozzle 370 size can also be changed for different operating conditions, such as different base loads or even dramatically different ambient air humidity.

Start Up of HFC/APU

Referring again to FIG. 1A, controls 146 include logic control circuitry (not shown) wired to operate solenoid-operated shutoff valve 304 (FIG. 3) responsive to the conventional ignition switch 144 of traction engine 102. Specifically, responsive to switch 144 being in the "accessory" position, controls 146 energize the solenoid of shutoff valve 304 and thereby open fail-closed valve 304, admitting hydrogen from hydrgen reservoir 147 to fuel cell 145.

Fuel cell 145 must also be fed air in order to generate electricity. APU 140 includes a 12 VDC electric motor driven blower 350 to supply feed air to fuel cell 145. Electric drive motor for blower 350 is ideally supplied initially by an external 12 VDC source at least for start up of fuel cell 145, which in the present embodiment of the invention is the 12 VDC system of the truck, including starter battery 165 and an alternator driven by the traction engine 102 (FIG. 1A). (See also a description of non-ideal, black start conditions, described herein below.) Initially, just as they do for hydrogen feed, controls 146 start the electric drive for blower 350 responsive to switch 144 being in the "accessory" position. Controls 146 initially start the blower 350 at low speed responsive to detecting the initial availability of 12 VDC.

In the course of startup of HFC 145, electric drive motor for blower 350 is eventually supplied by the voltage generated by HFC 145 itself. (Loads such as this that are needed for operation of HFC 145 and that may also be supplied by the output of HFC 145 itself are herein referred to as "hotel" loads.) That is, a 25 VDC to 12 VDC converter (not shown) is included in controls 146 to supply 12 VDC to blower 350 from the output of HFC 145. Specifically, the 25 VDC-12 VDC converter is controlled by control circuitry of controls 146 to connect blower 350 at low speed to the output from 25 VDC-12 VDC converter which is fed from the HFC 145 output electrode. This is done responsive to the control circuitry of controls 146 sensing that the output of HFC 145 has reached a first predetermined voltage threshold level of about 40 VDC. Then and responsive to the control circuitry sensing that the output of HFC 145 has reached a second predetermined voltage threshold level of about 56 VDC, the controls 146 control circuitry switches blower 350 to a higher speed.

In similar fashion, other hotel loads, including water pump 360 (FIG. 3), are switched from the truck 12 VDC supply to be carried by the 25 VDC to 12 VDC converter during startup of HFC 145 by controls 146.

In summary, responsive to introduction of hydrogen and air, fuel cell 145 generates on its output electrode a voltage which eventually may reach 72 VDC electrical potential relative to the grounded electrode.

Automatic Operation of APU for Driving AC Compressor

The 72 VDC output electrode is coupled to a DC-AC converter 134 via interrupting devices of a solid state contractor 133 in auxiliary controls 132 and via diode 148. (In an alternative embodiment, contractor 133 may, of course, be electromechanical.) Solid state contractor 133 is controlled by logic control circuitry of auxiliary controls 132 which receives signals from the conventional ignition switch 144 and the conventional AC controls and responds in such a manner that responsive to ignition switch 144 being in the "accessory" position, output voltage of the HFC 145 exceeding a certain level, and a demand for cooling being signaled by the conventional AC controls in cab 170, including the thermostat thereof, the logic control circuitry causes contractor 133 to change the state of its solid state "contacts" to conductively couple the electrical output of fuel cell 145 via DC-AC converter 134 to motor 120.

Thus, in summary, responsive to conventional ignition switch 144 being in the "accessory" position and a signal from conventional AC controls demanding cooling, converter 134 receives the fuel cell 145 electrical output and generates a three phase output of about 72 VAC that energizes, and thereby drives, motor 120. This rotates hub 216 of assembly 112 via belt 119 connected to pulley 118 of jackshaft 115. Rotation of hub 216 rotates the drive shaft of AC compressor 110 which forces coolant through the conventional AC cooling system to cool cab 170.

No Redundant Compressor, Conversion of Belt or Replacement of Drivers

It should be appreciated from the above that the embodiment of the invention shown in FIG. 1A enables cooling of the cab 170 by electrical power supplied by fuel cell 145 to motor 120 and making use of the conventional cooling system and cooling system controls without a redundant or replacement compressor 110 and without a conversion that would require disconnecting of serpentine belt 108 and addition of electrical drivers or rework of mechanical drivers, such as for the engine cooling water pump, oil pump, cooling air fan 105, etc.

Interlock Logic Preempts Auxiliary Electric Motor from Driving Compressor

Note that the "run" and "start" positions are conventionally the only positions of the ignition switch that will permit engine 102 to run. As previously stated, auxiliary controls 132 are wired to interlock with the ignition switch such that the ignition switch must be in the "accessory" position in order to connect the output of converter 134 for energizing motor 120 and in order to introduce fuel to fuel cell 145. This arrangement advantageously ensures that motor 120 is not energized via fuel cell 145 while engine 102 is running.

Additional Control and Power Features

Note also, an auxiliary fan 124 is also wired to logic control circuitry in auxiliary controls 132. The logic control circuitry receives a signal from switch 144 such that responsive to switch 144 in the "accessory" position, the logic control circuitry turns on an electric motor 124 for fan 126 so that fan 126 pulls air through AC condenser 107.

Starting battery 165 is conventionally included as an original feature of a line-haul truck and recharged by an alternator (not shown) that is driven by traction engine 102 via belt 108. Starting battery 165 is conventionally capable of supplying electrical accessories in cabin 170 for short intervals even when traction engine 102 is not running. However, starting battery 165 does not have sufficient capacity, of course, to supply these auxiliary loads for lengthy rests, such as rest stops and certainly not rests such as of overnight duration. Thus, according to an embodiment of the present invention illustrated in FIG. 1A, 72 VDC output of fuel cell 145 is also coupled to DC to DC converter 142, which converts the 72 VDC from fuel cell 145 to a 12 VDC output coupled to the 12 VDC starting battery 165 so that operation of fuel cell 145 tends to keep starting battery 165 charged.

In addition, according to an embodiment of the present invention illustrated in FIG. 1A the 72 VDC output of fuel cell 145 is also coupled via diode 148 to a 72 VDC buffer battery 160 and fuel cell 145 operation tends to keep this battery charged as well. Buffer battery 160 is provided to assist fuel cell 145 in meeting short duration electrical loads. Diode 148 is coupled with its cathode coupled to buffer battery 160 and its anode coupled to the output of fuel cell 145 such that if the electrical current drawn by the load on fuel cell 145 and buffer battery 160 pulls the voltage down on fuel cell 145 beyond a certain limit, i.e., such that the voltage drop across diode 148 exceeds 0.6V this reverse biases diode 148 so that buffer battery 160 picks up the load.

Logic or Flow Chart Diagrams

Figure 12A:
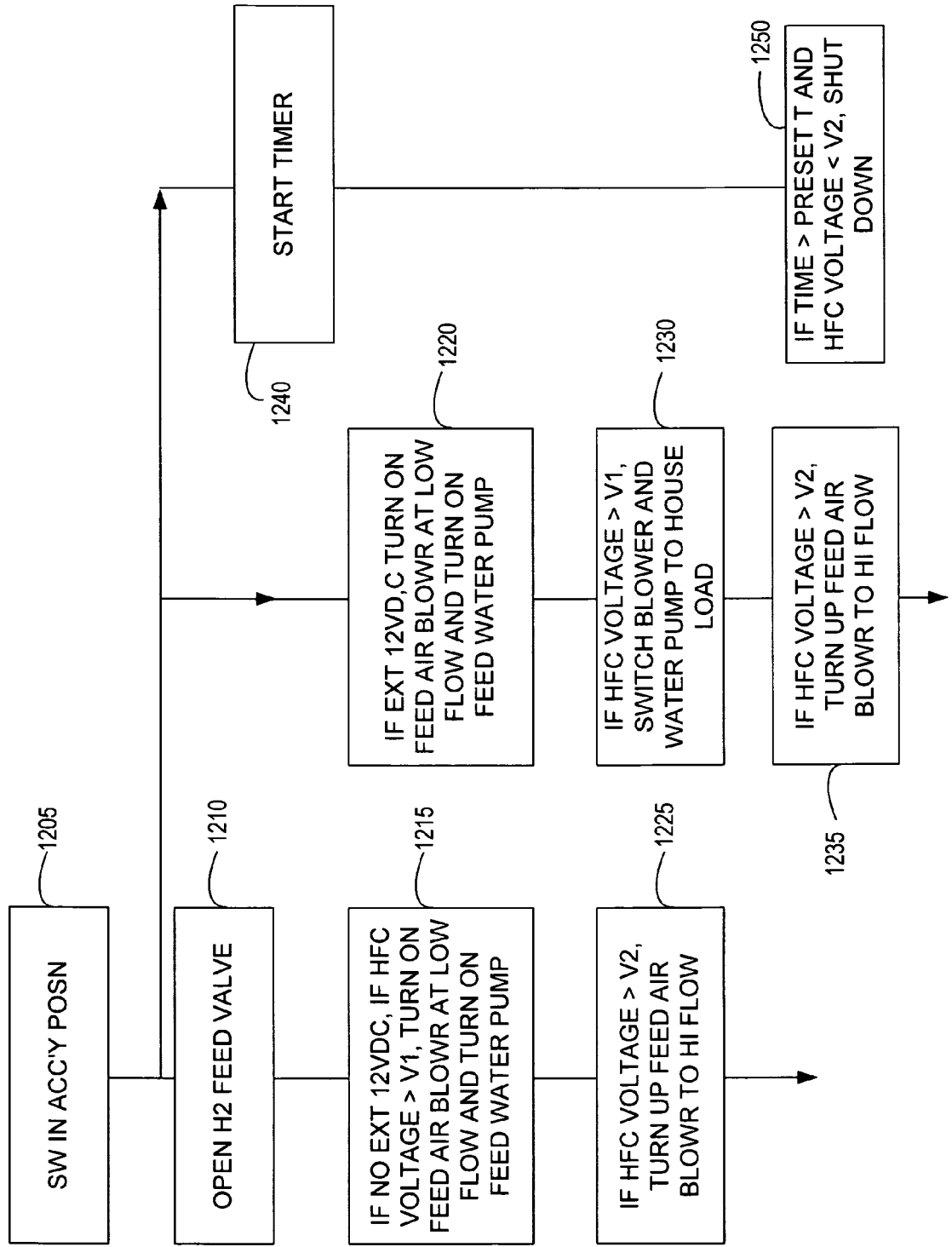
FIGS. 12A and B illustrate logic for the auxiliary system, according to an embodiment of the present invention.

Referring now to FIGS. 12A and 12B logic is illustrated for the auxiliary system, according to an embodiment of the present invention. Logic circuitry detects ignition switch in an accessory position at logic block 1205. Responsively, logic circuitry opens an automatic hydrogen feed solenoid valve to admit hydrogen to HFC at logic block 1210. Also, logic circuitry detects at 1215 and 1220 whether external 12 VDC is available. If yes, then at block 1220 logic circuitry turns on air feed blower at low flow and turns on feed water pump. Then, at block 1225 if logic circuitry detects HFC output has exceeded a first voltage level V1, the circuitry switches the blower an water pump to the house load. Then, at block 1230 if logic circuitry detects HFC output has exceeded a second voltage level V2, the circuitry switches the blower to a higher speed.

If 12 VDC is not detected, this is a black start. Then, at block 1215 if logic circuitry detects HFC output has exceeded a first voltage level V1, the circuitry turns on air feed blower at low flow and turns on feed water pump, both on house load. Then, at block 1225 if logic circuitry detects HFC output has exceeded a second voltage level V2, the circuitry switches the blower to a higher speed.

Meanwhile, upon detecting ignition switch in accessory position, logic starts a timer at 1240. If at 1250 the logic determines the time has exceeded a preset time and the HFC voltage has not exceeded V2, the logic shuts down the system, i.e., shutting the hydrogen feed valve and water feed pump, etc.

Electrical Nature of Auxiliary Electric Motor and Implications

Returning to the subject of the connection between traction engine 102 and electric motor 120 and to the subject of the type of electric motor shown in FIG. 1A, it should be noted that it is particularly advantageous AC motor 120 in the illustrated embodiment of the invention is a three phase motor, which is smaller and lighter than a single-phase AC motor of similar horsepower rating. Also, motor 120 is well-suited to turn freely when de-energized without wearing out brushes, as would be the case for a DC motor, which has brushes. That is, because motor 120 is a three phase motor having no brushes, it may be de-energized and will turn freely with little resistance or wear when traction engine 102 is running. An implication of this arrangement is that a clutch is not required for motor 120, as will now be further explained.

Referring now to FIG. 1B, an alternative is illustrated, in which a clutch assembly 190 is provided for an alternative electric motor driver 120ALT and coupled to AC compressor 110. This aspect of FIG. 1B has some similarity to an arrangement disclosed by Blacquire et al. in which an electric motor that serves as an alternative driver for an AC compressor has its own clutch, so that when the traction engine is running the electric motor may be disengaged by the motor's clutch. See Blacquire et al., FIG. 6 (clutch 12). However, note that in FIG. 1B of the present application, clutch assembly 190 for motor 120ALT is coupled via clutch assembly 112, flange 115 and jackshaft 114 to AC compressor 110, rather than being coupled by a bolt extending the drive shaft of compressor 110.

Furthermore, the distal end of jackshaft 114 is also supported by bearing 116 and bracket 117. Compare Blacquire et al., FIG. 5 (bolt 21 for threading directly into compressor drive shaft 20 to hold additional pulley 18). The arrangement of bracket 117, bearing 116, jackshaft 114 and flange 115 secured to assembly 112, as illustrated in both FIGS. 1A and 1B of the present application, advantageously provides a larger jackshaft 114 and also provides additional distal support to jackshaft 114, so that jackshaft 114 is more capable of withstanding large, sustained side loading.

Referring again to FIG. 1A, note that pulley 118 is added at AC compressor 110 to connect drive belt 119 between electric motor 120 and AC compressor 110. As previously stated herein, Blackquire et al. also teach adding a pulley at an AC compressor for connecting a drive belt between an electric motor and AC compressor. However, according to the teaching of Blackquire et al., the added pulley is fixed directly to the drive shaft of the AC compressor. In contrast, according to of the embodiment of the present invention shown in FIG. 1A, pulley 118 is fixed by jackshaft 114 to the original hub 216 of assembly 112, not to the drive shaft of AC compressor 110. Thus, even though traction engine 102 continually turns pulley 206 when engine 102 is running, and even though there is no clutch in FIG. 1A for motor 120 so that the turning of pulley 206 always turns the shaft of motor 120, nevertheless, this is not harmful because when traction engine 102 is running motor 120 is de-energized, as is assured by interlocking controls, as described herein above. And since motor 120 is a three phase motor, it is smaller than a single phase motor of corresponding capacity and has no brushes, as would a DC motor, so engine 102 may freely turn motor 120 with little resistance or wear on motor 120.

In addition, it is an inherent property of a three phase motor that if its drive shaft is mechanically rotated the motor will operate as a generator to supply any electrical load on it's electrical "supply" leads. Converter 134 is capable of converting in either direction, i.e., 72 VDC to three phase 72 VAC from fuel cell 145 and buffer battery 160 to motor 120, or three phase 72 VAC to 72 VDC from motor 120 (operated as a generator) to buffer battery 160. (Diode 148 prevents converter 134 from electrically driving fuel cell 145.) Thus, while the fuel cell 145 is out of service while traction engine 102 is running, at which time motor 120 is driven by traction engine 102 (via belt 108, pulley 206 (FIG. 2), jackshaft 114, pulley 118, belt 119, and pulley 122), motor 120 operates as a generator and recharges buffer battery 160. This also provides an advantage in cold weather because it supplies at least a small, continual charging current on battery 160 while traction engine 102 is running, which improves operation of battery 160.

Use of APU for Black Start

In the event of a failure or discharge of starting battery 165, which is referred to as a "black start" situation, auxiliary power unit ("APU") 140 and controls 146 may be used to start the truck. Referring again to FIG. 3, certain details are shown regarding use of auxiliary power unit ("APU") 140 and controls 146 for such a black start. As previously mentioned, fuel cell 145 must be fed air in order to generate electricity. APU 140 includes a 12 VDC electric motor driven blower 350 to supply feed air to fuel cell 145. As previously mentioned, electric drive motor for blower 350 is ordinarily initially supplied by an external 12 VDC source at least for start up of fuel cell 145, which in the present embodiment of the invention is the 12 VDC system of the truck, which includes starter battery 165 and an alternator driven by the traction engine 102 (FIG. 1A). However, if engine 102 is not running and battery 165 is dead, this external power source for blower 350 is not available.

According to a feature of an embodiment of the present invention, hose 330 is provided with suitable fittings for connecting air supply connection 320 for fuel cell 145 via hose 330 to a conventional valve stem of one of the inflated tires on the truck (not shown). The driver may connect one end of hose 330 to the tire stem of an inflated tire (not shown) and connect the other end of hose 330 to connection 320 in order temporarily supply air to fuel cell 145 from the tire. Then, with the ignition switch 144 in the "accessory position" the driver may temporarily move bypass valve 303 actuator manually to the previously described "bypass" position, so that hydrogen is fed to fuel cell 145 from hydrogen tank 147 (FIG. 1A) via permanent connection 310.

This air and hydrogen feed results in fuel cell 145 initiating production of an electrical potential, which begins to build toward a possible maximum open circuit voltage that may eventually reach more than 72 VDC. At about 40 VDC output, control circuitry in auxiliary controls 132 senses the output voltage of fuel cell 145 has exceeded a first predetermined threshold, and control circuitry 132 turns on drive blower 350 at its lowest air flow rate, i.e., supplying it from the 25 VDC-12 VDC converter of controls 146 (FIG. 1A). This additional air flow tends to increase electrical production of the fuel cell 145, raising the output voltage higher toward the eventual maximum voltage. At about 56 VDC output, control circuitry in auxiliary controls 132 senses the output voltage of fuel cell 145 has exceeded a second predetermined threshold, and control circuitry 132 turns on drive blower 350 at normal, full air flow rate.

Once the output of fuel cell 145 has reached about 56 VDC, which typically takes only about one minute, the air flow rate supplied by drive blower 350 alone is sufficient to maintain fuel cell 145 full operation. (Since this typically takes only about a minute, the air released from the truck tire starting fuel cell 145 does not substantially reduce the tire pressure.) Having sensed the output voltage of fuel cell 145 exceeding the second predetermined threshold, control circuitry 132 also energizes hydrogen automatic feed solenoid valve 304. The driver may then release the actuator of bypass valve 303, which spring returns to the normal position. In addition, control circuitry 132 also connects the output of fuel cell 145 to DC-DC converter 142 responsive to the output voltage of fuel cell 145 exceeding the second predetermined threshold, which supplies 12 VDC starter battery 165 to begin recharging.

Also during a black start of HFC 145, the water feed from pump 360 is initially not supplied. Responsive to the first predetermined voltage threshold level, controls 146 automatically turn on pump 360 during the starting sequence.

For black start, as well as in normal start up wherein external 12 VDC is available, controls 146 include voltage sensing circuitry and timer circuitry for shutting down HFC 145, i.e., closing the automatic hydrogen feed solenoid valve and turning off the air supply blower, etc., if its output does not reach the second predetermined voltage threshold level within a preset time, such as one minute.

Electrical Heating for Cabin

Figure 4:
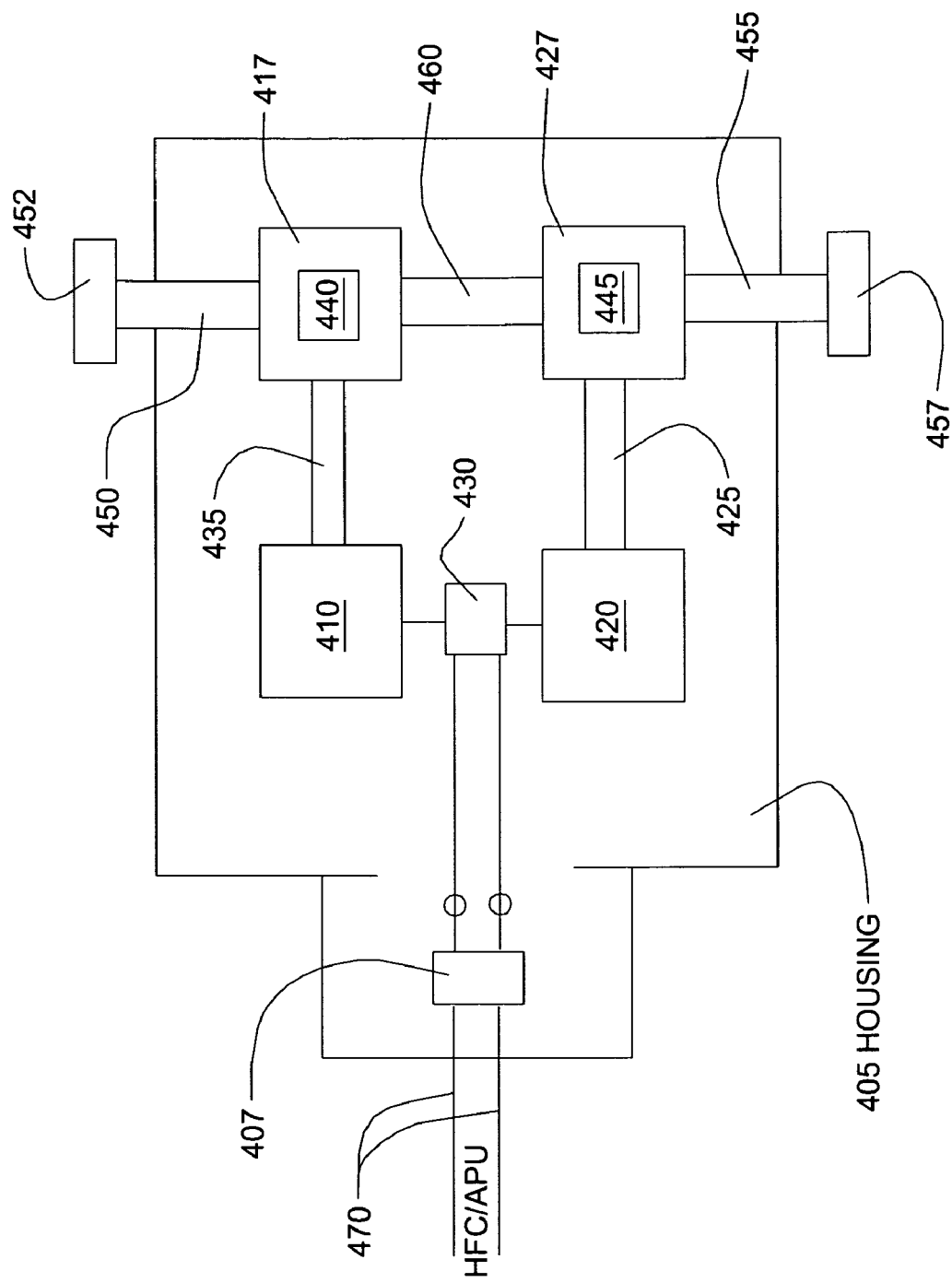
FIG. 4 schematically illustrates a portable heating and ventilating subsystem for an auxiliary system, according to an embodiment of the present invention.

Herein above, features of an embodiment of the present invention have been described for providing comfort cooling in the truck cabin 170 (FIG. 1A). Another aspect of the invention concerns comfort heating and ventilating in cabin 170. Referring now to FIG. 4, a portable air heating and ventilating ("HV") subsystem 400 is shown, according to an embodiment of the invention. Subsystem 400 includes two squirrel cage blowers 410 and 420 mounted in housing 405 with drive shafts mechanically coupled to 12 VDC motor 430, which is electrically connected via control panel 407 to the 12 VDC output of APU 140 (FIG. 1A). Blowers 410 and 420 blow air through ducts 415 and 425 into respective subhousings 417 and 427 which each contain 1 KW thermistor heating elements 440 and 445 that are electrically connected to the 12 VDC output of APU 140 via panel 407. Panel 407 includes thermostats (not shown) wired to interrupt the 12 VDC supply to thermistor heating elements 440 and 445 according to a temperature setpoint. Heated air is forced out of housings 417 and 427 by blowers 410 and 420 through respective ducts 450 and 455 which terminate in diverter valves 452 and 457. Housings 417 and 427 are interconnected by a duct 460 so that subsystem 400 may blow air through both housings 417 and 427 with just one of the blowers 410 and 420 in operation.

Figure 5:
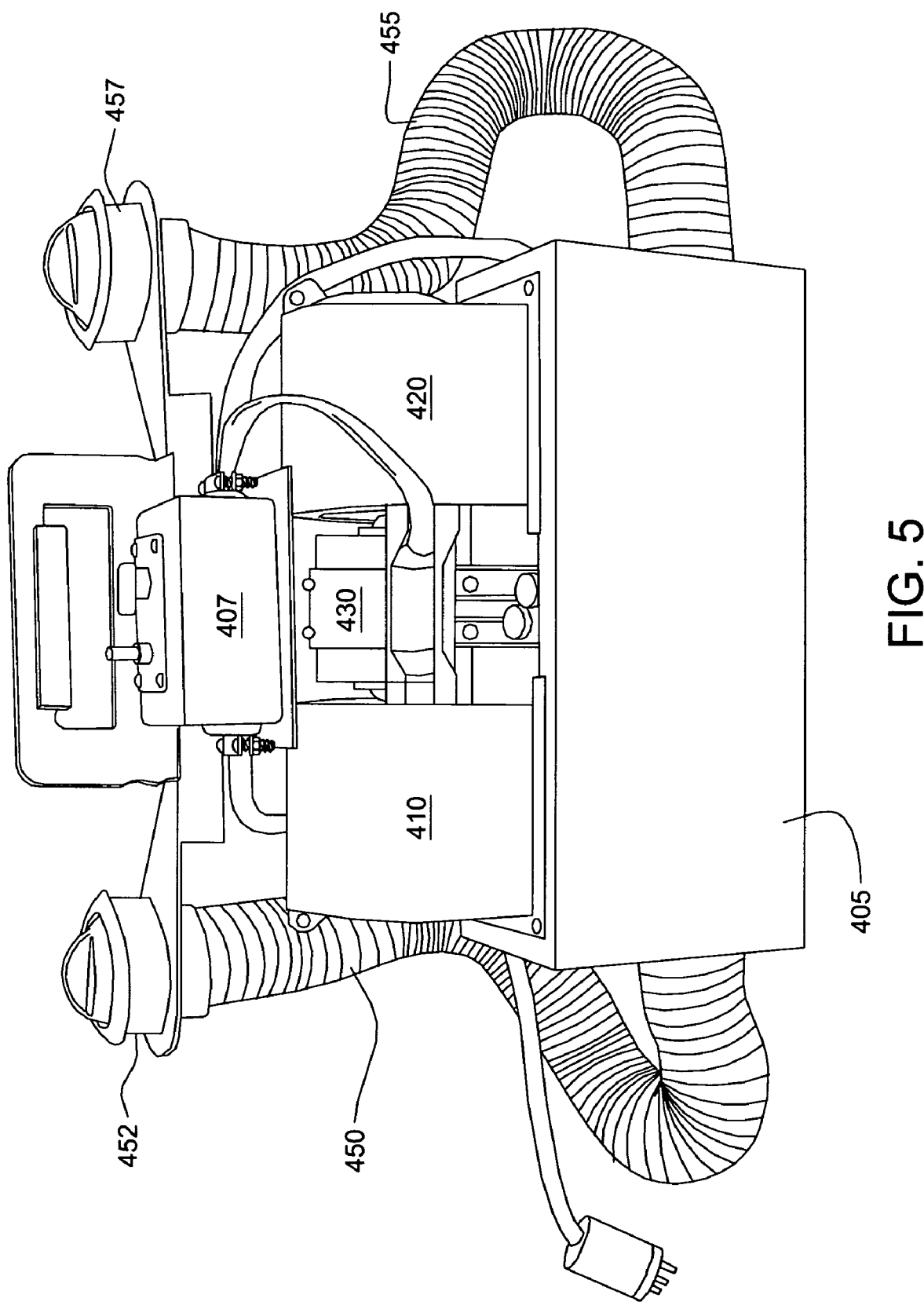
FIG. 5 pictorially illustrates the portable heating and ventilating subsystem of FIG. 4.

Shown in FIG. 5 is a pictorial illustration of the HV subsystem 400, according to an embodiment of the invention. In this view, housing 405 is visible, as well as casings for blowers 410 and 420, motor 430, control panel 407, ducts 450 and 455, diverter valves 452 and 457, and electrical cable 470 to APU 140.

Securing APU on a Truck

Figure 6A:
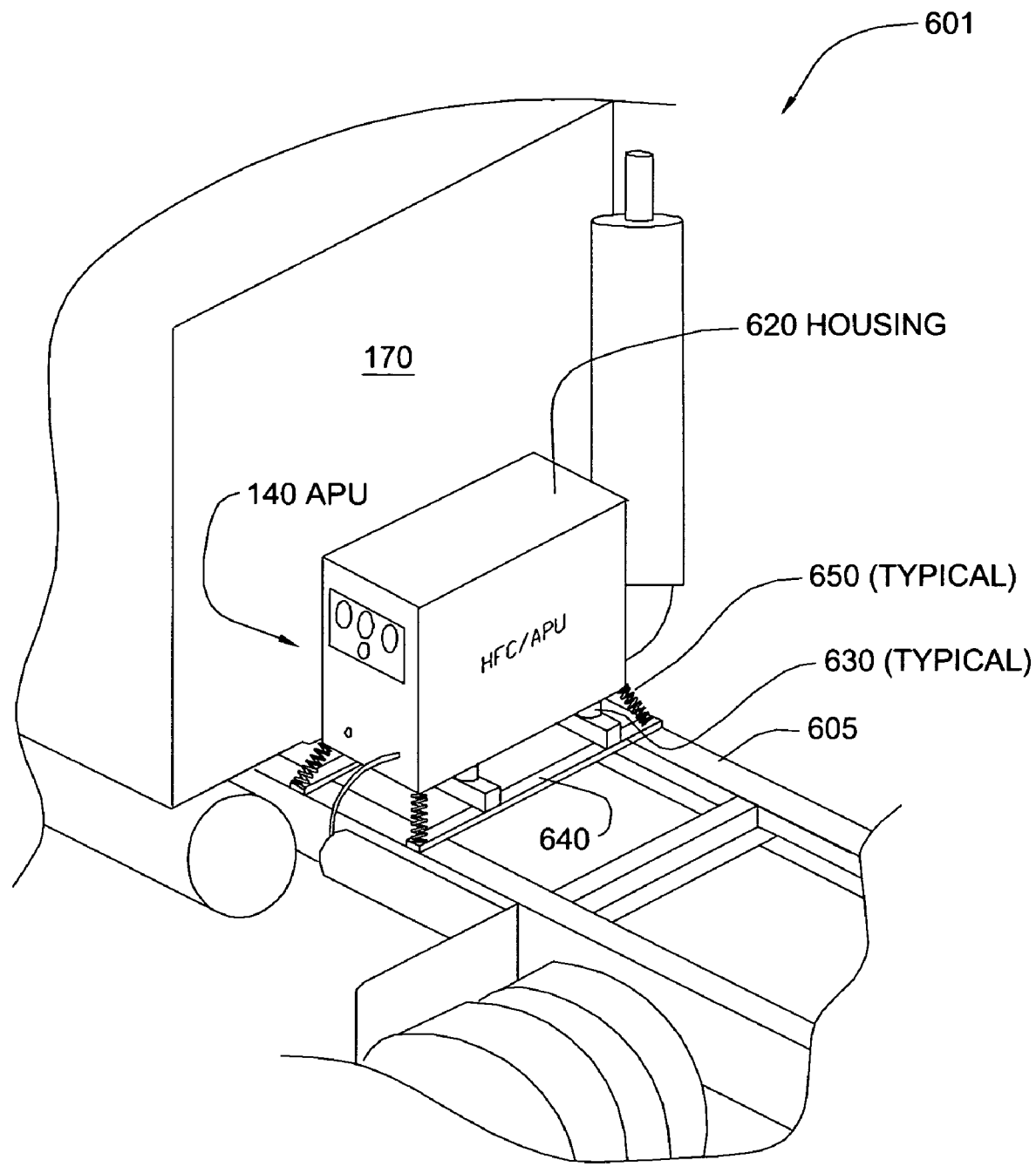
FIGS. 6A and 6B illustrate attachment of an auxiliary power unit to a line-haul truck, according to an embodiment of the present invention.

Referring now to FIG. 6A, APU 140 of FIG. 1A, is illustrated in secure attachment to a line-haul truck 601, according to an embodiment of the invention. APU 140 is approximately 33" long×25" high×13" deep and weighs about 186 pounds and is shown secured behind cabin 170 on frame 605 of a tractor portion of truck 601. Cabin 170 also rides on frame 605. APU 140 includes a rectangular housing 620 for fuel cell 145 (FIG. 1). The bottom of housing 620 is bolted to respective air springs 630 located directly below the four corners of housing 620. APU 140 further includes a spreader 640 to which air springs 630 are bolted.

Figure 6B:
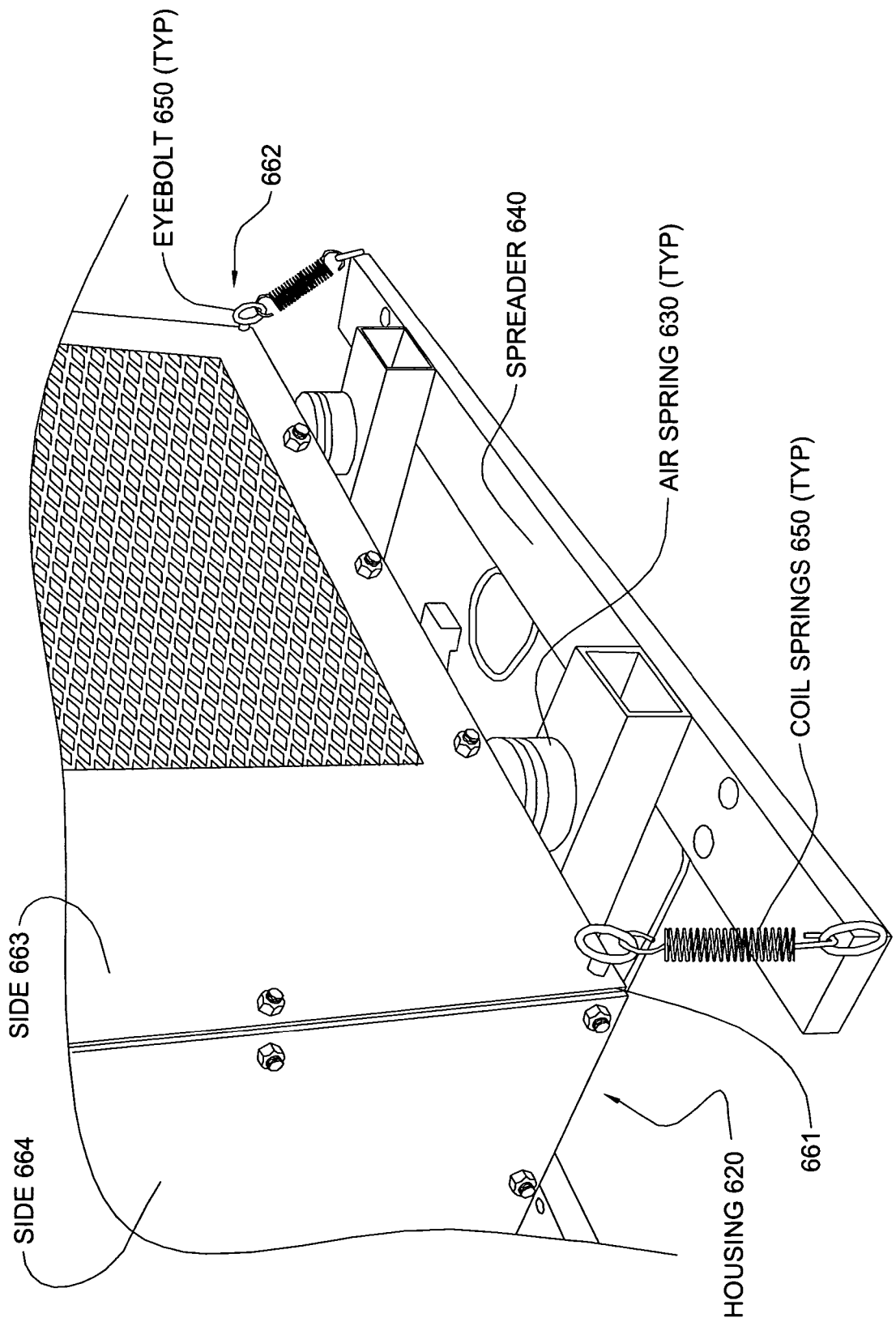

Referring now to FIG. 6B, a close up view is shown of the lower portion of housing 620, including two corners 661 and 662, with respective ones of air springs 630 bolted to the top of spreader 640 and to the bottom of housing 620, near respective corners 661 and 662. Also shown are two coil springs 650 connected to spreader 640 by respective eyebolts 650 that are bolted to one side 663 of housing 620 near respective corners 661 and 662, such that the connections of coil springs 650 at spreader 640 are located so as to keep coil springs 650 extended downward from the bottom of housing 620 and outward from not only from side 663, but also from side 664 that is adjacent to side 663 and from the side (not shown) that is adjacent to side 663 and opposite side 664. In addition to coil springs 650 being held by spreader 640 in a manner extending outward from sides 663, 664, etc. and downward from the bottom of housing 620 as shown, coil springs are also somewhat stretched by spreader 640, but are well within their elastic limit. In this way, springs 620 are held in tension and tend to provide forces opposing one other and keeping housing 620 centered above and pulled down securely toward air springs 630.

Figure 7:
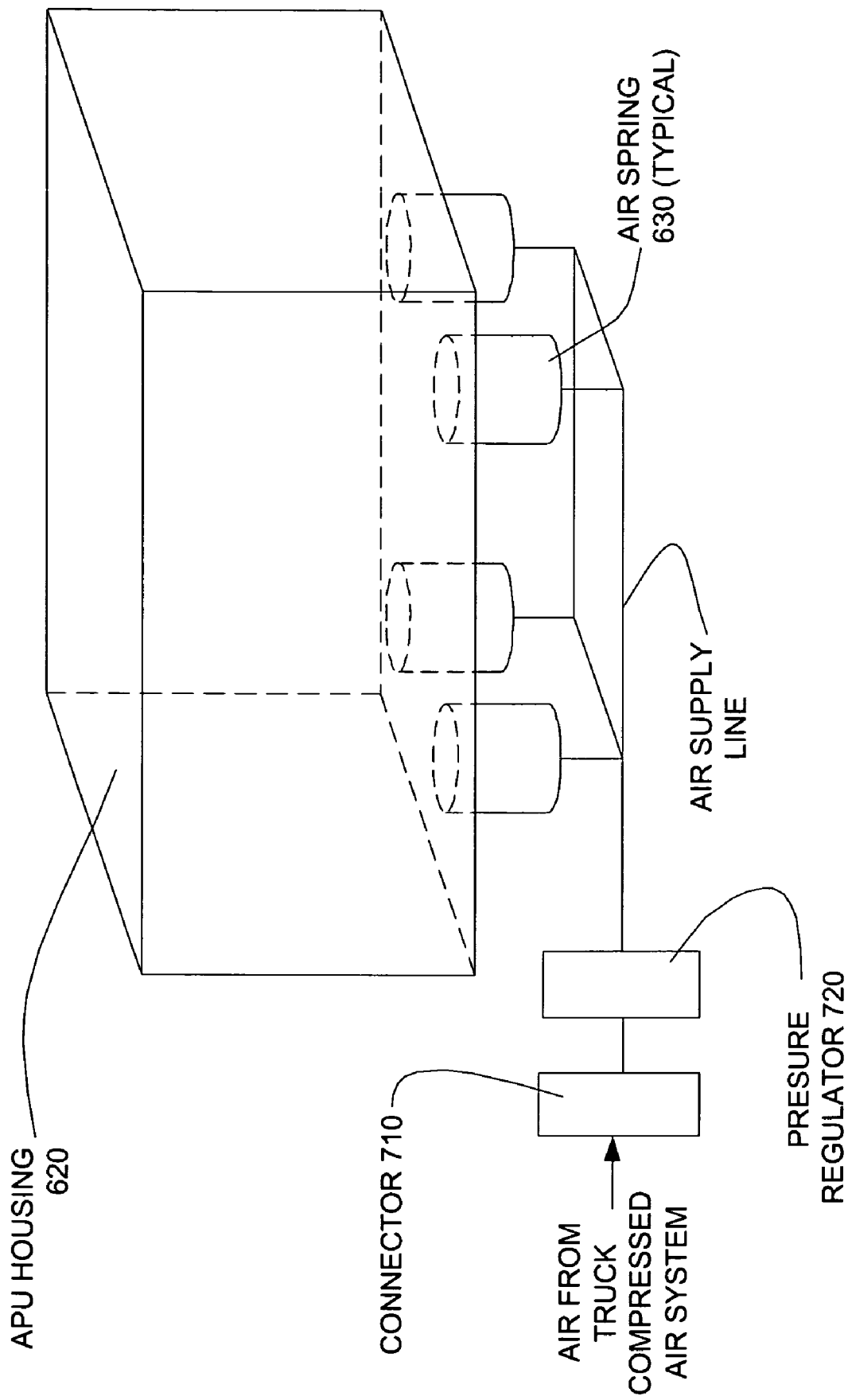
FIG. 7 illustrates an air supply connection to air springs of the arrangement shown in FIGS. 6A and 6B.

Referring now to FIG. 7, certain additional details are illustrated for securing the APU 140 to the truck, according to an embodiment of the invention. In FIG. 7, it may be seen that air springs 630 are interconnected by an air supply line 705 having a connection 710 via a pressure regulator 720 for connecting air springs 630 to the conventional compressed air system (not shown) of truck 601 (FIG. 6). In this manner, after spreader 640 of APU 140 is bolted to frame 605, air springs may be inflated from the compressed air system, which adds to the tension of coil springs 650 and thereby more securely keeps housing 620 centered above and pulled down toward air springs 630. It is advantageous that housing 620, which holds fuel cell 145, is thus secured to frame 605 of truck 601 without any rigid members, or even piston-type shock absorbers, that can directly transfer the shocks of bumps and jerks from frame 605 to housing 620. Although shock absorbers do, of course, tend to absorb such shocks in a single direction, they do tend to prevent movement in some directions, so that they do have a greater tendency to transfer forces from some directions than does the arrangement illustrated in FIG. 6.

Figure 8:
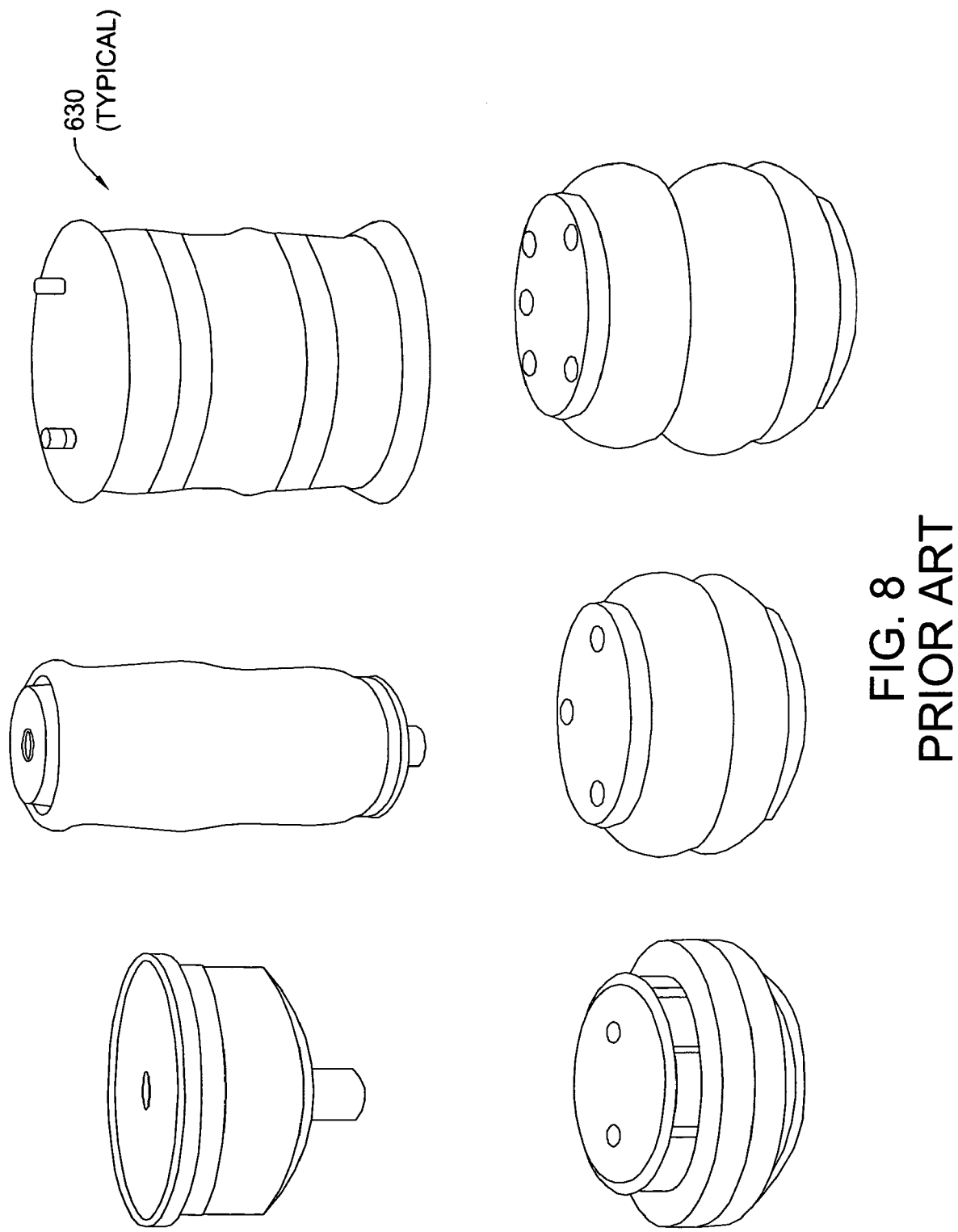
FIG. 8 pictorially illustrates prior art air springs that may be used for the arrangement shown in FIGS. 6A and 6B.

Referring now to FIG. 8, conventional air springs that are suitable for use as the air springs 630 illustrated in FIG. 7 are illustrated, according to prior art. Such air springs are available, for example, from McMAster-Carr.

Heat Exchanger

Figure 9:
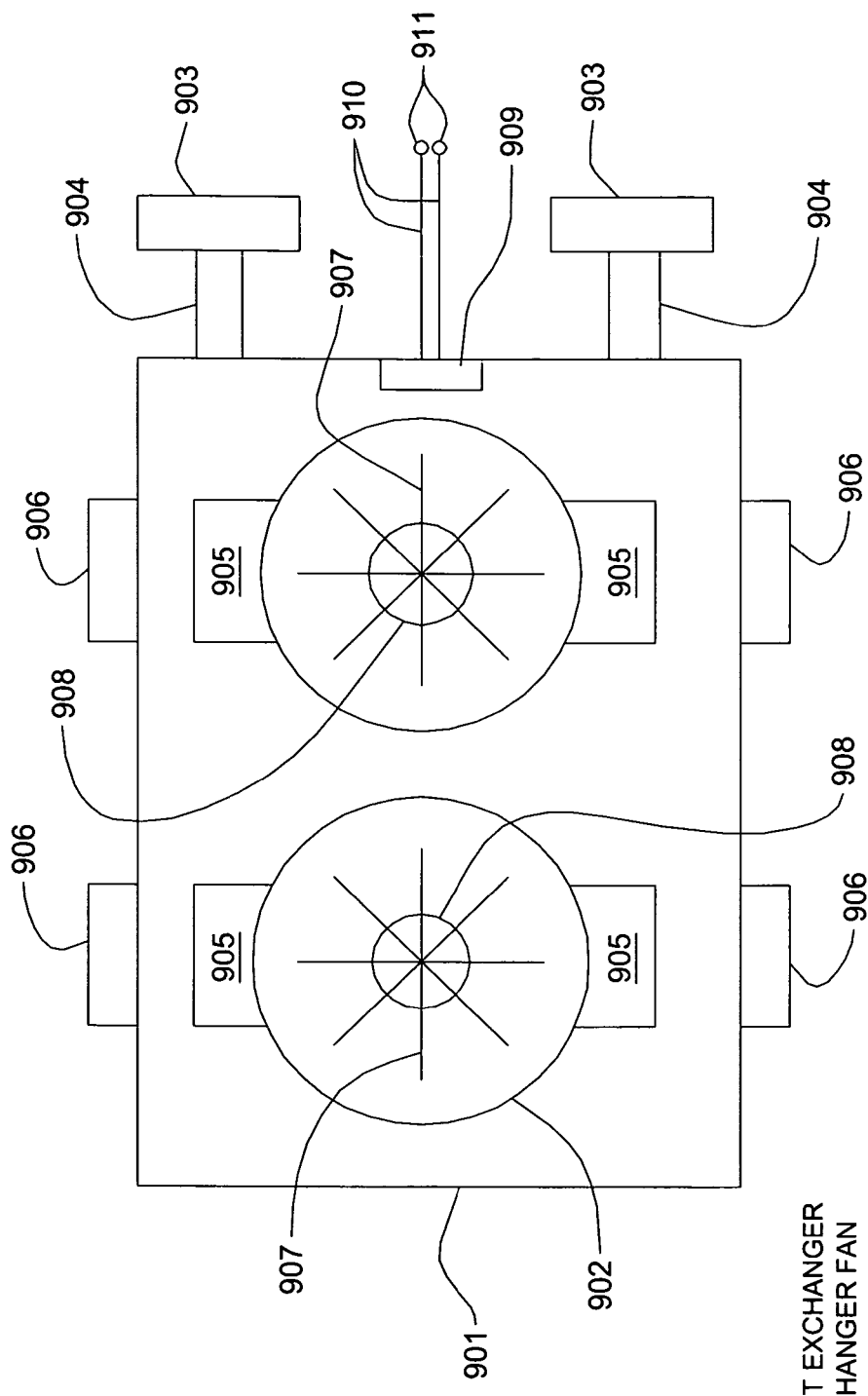
FIG. 9 illustrates a heat exchanger for an auxiliary power unit, according to an embodiment of the present invention.

Referring now to FIG. 9, a heat exchanger assembly 900 is illustrated, according to an embodiment of the present invention. Assembly 900 is mounted in housing xxx of APU 140 to cool HFC 145, and includes heat exchangers 901 mounted by brackets 906. Water flows through exchangers 901 via water supply connections 903 and tubing 902. Air is blown through the exchangers 901 by fan drivers 908 having blades 907 and mounted by fan mounting brackets 905. Fan drivers 908 are 12 VDC hotel loads that are turned on by control circuitry 146 responsive to HFC 145 reaching its second predetermined voltage level on startup. Specifically, only a first one of fan drivers 908 is turned on if a temperature signal from temperature switch 909 indicates a temperature measured at the heat exchanger does not exceed a predetermined setpoint. Otherwise control circuitry 146 turns on both fan drivers 908.

General Remarks and Variations

While the invention has been particularly shown and described with reference to a preferred embodiment, it will be understood that various changes in form and detail may be made therein without departing from the spirit, and scope of the invention. To reiterate, one or more embodiments were chosen and described in order to best explain the principles of the invention and its practical application, and to enable others of ordinary skill in the art to understand the invention. Various other embodiments having various modifications may be suited to a particular use contemplated, but may be within the scope of the present invention.

Herein above, and in the following claims, the term "comprises" is synonymous with "includes." The use of terminology such as "X comprises A, B and C" is not intended to imply that A, B and C are necessarily all of the components of X, unless this is clearly and explicitly stated. Likewise, the terms "including," "carrying," "having," "containing," "involving," and the like are to be understood to be open-ended, that is, to mean including but not limited to. Only the transitional phrases "consisting of" and "consisting essentially of," respectively, shall be closed or semi-closed transitional phrases, as set forth, with respect to claims, in the United States Patent Office Manual of Patent Examining Procedures (Eighth Edition, August 2001 as revised May 2004), Section 2111.03.

The claims that follow are not intended to imply any particular sequence of actions, unless this is clearly and explicitly stated. The inclusion of labels, such as a), b), c), etc., for portions of the claims does not, by itself, imply any particular sequence, but rather is merely to facilitate reference to the portions. Likewise, use of ordinal terms such as "first," "second," "third," etc., in the claims to modify a claim element does not by itself connote any priority, precedence, or order of one claim element over another or the temporal order in which acts of a method are performed. Such ordinal terms may be used merely as labels to distinguish one claim element having a certain name from another element having a same name (but for use of the ordinal term). Of course, ordinal terms in the context of ranking do indicate order.

What is claimed is:

1. An air conditioning system for a cabin of a vehicle comprising:
an air conditioning compressor having a drive shaft with a hub that is rotated to operate the air conditioning compressor;
an electrically operated clutch for coupling a first pulley to the drive shaft of the air conditioning compressor in response to control signals, the first pulley rotated by a first belt coupled to a drive engine of the vehicle;
a jackshaft rigidly coupled to the hub of the air conditioning compressor; and
a second pulley rigidly coupled to the jackshaft and driven by an electric motor with a second drive belt, wherein an end of the jackshaft not coupled to the hub is rotatably coupled with a bearing to a bearing bracket to reduce side loading on the jackshaft from the second drive belt.

2. The system of claim 1, further comprising an auxiliary controller generating the control signals in response to vehicle cabin controls.

3. The system of claim 2, wherein the auxiliary controller generates a control signal that disengages the clutch when the electric motor is powered and driving the jackshaft via the second drive belt.

4. The system of claim 2, wherein the electric motor is powered by a fuel cell system generating a fuel cell DC voltage.

5. The system of claim 4, wherein the electric motor is a 3-phase AC motor powered by a 3-phase AC voltage.

6. The system of claim 5, further comprising a DC to AC converter system having an input coupled to an output of the fuel cell system and generating the 3-phase AC voltage for the electric motor in response to control signals from the auxiliary controller.

7. The system of claim 6, further comprising a buffer battery having a battery output coupled with a diode to the input of the DC to AC converter system, wherein the buffer battery is charged by the fuel cell system when its charge is low and assists the fuel cell system in supplying power when it is charged and a DC output of the fuel cell system is low.

8. The system of claim 6, further comprising an auxiliary fan for cooling a condenser of the air conditioning system when the vehicle engine is not running, the auxiliary fan powered from a DC voltage in the DC to AC converter system in response to the control signals from the auxiliary controller.

9. The system of claim 6, wherein a fuel cell in the fuel cell system is a hydrogen fuel cell coupled to a source of pressurized hydrogen and a source of pressurized air.

10. The system of claim 9, wherein the source of pressurized air is supplied by a blower powered by the fuel cell.

11. The system of claim 9, wherein the source of pressurized air is supplied from an external pressurized air source when the fuel cell is in a start-up mode.

12. The system of claim 11, wherein the external pressurized air source is a pressurized tire of the vehicle.

13. The system of claim 4, wherein a starting battery of the vehicle is charged by the fuel cell system when the starting battery is discharged or is at a low charge state.

14. The system of claim 9, wherein the fuel cell system includes the DC to AC converter, the auxiliary controller, the fuel cell, a blower, a buffer battery, and the source of pressurized hydrogen.

15. The system of claim 14, wherein the fuel cell system is mounted to a chassis of the vehicle and mechanically coupled to the jackshaft of the air compressor with the second drive belt and electrically coupled to the auxiliary fan and cabin controls of the vehicle.

16. The system of claim 11, further comprising circuitry tor starting the vehicle by supplying the fuel cell system with the external source of pressurized air.

17. The system of claim 10, wherein the blower is electrically coupled to an output of the fuel cell and operated at a reduced blower speed in response to control signals from the auxiliary controller when a fuel cell DC voltage reaches a first value, and the blower speed is increased when the fuel cell DC voltage reaches a second value greater than the first value.

18. The system of claim 16, wherein the AC motor is configured as a generator when the vehicle drive engine is running thereby generating a source of AC power.

19. The system of claim 12, wherein the pressurized tire of the vehicle is coupled to the fuel cell system using a hose with a standard valve stem connector.

20. An auxiliary system for a vehicle comprising:
a hydrogen fuel cell receiving a regulated flow of pressurized hydrogen, pressurized air and generating a DC voltage output;
a DC to AC converter receiving the DC voltage output and generating 3-phase AC output voltages;
an electric motor coupled to the 3-phase AC output voltages and having an output shaft coupled with a drive belt to a jackshaft coupled to a hub of a compressor of an air conditioning system of the vehicle;
a controller receiving the DC voltage output and generating a charge voltage for a starter battery of the vehicle and a fan drive voltage; and
an auxiliary fan coupled to the fan drive voltage and generating an air stream directed to a condenser for the air conditioning system of the vehicle, wherein the hydrogen fuel cell, a source of pressurized hydrogen, the DC to AC converter, the electric motor and the controller are in a system module.

21. The system as recited in claim 20, wherein the system module is mounted to a chassis of the vehicle using air shock mounts.

22. An air conditioning system for a vehicle comprising:
a condenser for the air conditioning system normally cooled in response to air flow from fan blades coupled to a drive engine of the vehicle;
an auxiliary fan receiving an auxiliary fan voltage and directing an auxiliary air flow to the condenser;
a compressor for the air conditioning system having a drive shaft coupled to a first pulley with an electrically operated clutch, the first pulley coupled with a first drive belt to the drive engine of the vehicle;
a jackshaft connected to a hub on the drive shaft of the compressor, wherein an end of the jackshaft is rotatably coupled to a bearing attached to a bearing plate;
an auxiliary AC electric motor having a drive shaft rigidly coupled to a second pulley, the second pulley coupled with a second drive belt to the jackshaft, wherein the drive engine rotates the compressor and the electric motor when an electric operated clutch is engaged and the electric motor rotates the compressor when the electric operated clutch is disengaged;
a fuel cell system receiving pressurized hydrogen and a stream of pressurized air and generating a DC output voltage;
a controller receiving the DC output voltage and cabin controls and generating the auxiliary fan voltage and a converter output;

a DC to AC converter receiving the converter output and generating an AC voltage for the auxiliary AC electric motor.

23. The system of claim 22, wherein the fuel cell system comprises:
a hydrogen fuel cell;
a pressurized tank of hydrogen coupled to the hydrogen fuel cell;
a blower for supplying the stream of pressurized air to the hydrogen fuel cell;
a fuel cell controller receiving a voltage output from the hydrogen fuel cell, cabin controls, and generating the DC output voltage and a voltage to power the blower; and
a DC to DC converter receiving the DC voltage output from the fuel cell controller and generating a charge voltage for a starter battery of the vehicle.

24. The system of claim 23, wherein the stream of pressurized air is supplied from and external source such as an air compressor or a pressurized tire of the truck.

25. The system of claim 22, wherein the AC electric motor is operated as a generator when the drive engine rotates the AC electric motor when the electric operated clutch is engaged.

26. A truck comprising:
a cabin for a driver;
a chassis configured to couple to a trailer or a load carrying bed; and
an air conditioning system for the cabin of the truck having a condenser for the air conditioning system normally cooled in response to air flow from fan blades coupled to a drive engine of the truck, an auxiliary fan receiving an auxiliary fan voltage and directing an auxiliary air flow to the condenser, a compressor for the air conditioning system having a drive shaft coupled to a first pulley with an electrically operated clutch, the first pulley coupled with a first drive belt to the drive engine of the truck, a jackshaft directly coupled to a hub on the drive shaft of the compressor, wherein an end of the jackshaft is rotatably coupled to a bearing attached to a bearing plate, an auxiliary AC electric motor having a drive shaft rigidly coupled to a second pulley, the second pulley coupled with a second drive belt to the jackshaft, wherein the drive engine rotates the compressor and the electric motor when an electric operated clutch is engaged and the electric motor rotates the compressor when the electric operated clutch is disengaged, a fuel cell system receiving pressurized hydrogen and a stream of pressurized air and generating a DC output voltage, a controller receiving the DC output voltage and cabin controls and generating the auxiliary fan voltage and a converter output, and a DC to AC converter receiving the converter output and generating an AC voltage for the auxiliary AC electric motor.

27. The system of claim 26, wherein the fuel cell system comprises:
a hydrogen fuel cell;
a pressurized tank of hydrogen coupled to the hydrogen fuel cell;
a blower for supplying the stream of pressurized air to the hydrogen fuel cell;
a fuel cell controller receiving a voltage output from the hydrogen fuel cell, cabin controls, and generating the DC output voltage and a voltage to power the blower; and
a DC to DC converter receiving the DC voltage output from the fuel cell controller and generating a charge voltage fur a starter battery of the truck.

28. The system of claim 27, wherein the stream of pressurized air is supplied from an external source such as an air compressor or a pressurized tire of the truck.

29. The system of claim 26, wherein the AC electric motor is operated as a generator when the drive engine rotates the electric motor when the electric operated clutch is engaged.

30. A method for operating an air conditioning system for a cabin of a vehicle driven by an internal combustion engine (ICE), wherein a compressor of the air conditioning system has a drive shaft with a hub that is rotated to operate the compressor, the drive shaft of the air conditioning compressor coupled to a first pulley with an electrically operated clutch responsive to control signals, the first pulley rotated by a first belt coupled to the ICE, a jackshaft rigidly coupled to the hub of the air conditioning compressor, a second pulley rigidly coupled to the jackshaft, and an electric motor coupled to the second pulley with a second drive belt, wherein an end of the jackshaft not coupled to the hub rotatably with a bearing is coupled to a bearing bracket to reduce side loading on the jackshaft from the second drive belt. the method comprising:
responsive to the control signals, driving the electric motor with an auxiliary power source to operate the air conditioning system when the ICE is off and the electrically operated clutch disengages the first pulley from the drive shaft of the air conditioning compressor, wherein the auxiliary power source comprises a battery based power source having series and parallel connected battery cells configured to generate a battery DC voltage.

31. The method of claim 30 further comprising generating the control signals with an auxiliary controller in response to cabin controls in the vehicle.

32. The method of claim 31, wherein the auxiliary controller generates a control signal that signals the clutch to disengage the first pulley from the drive shaft of the air conditioning compressor when the electric motor is powered and driving the jackshaft via the second drive belt.

33. The method of claim 30, wherein the auxiliary power source further comprises a fuel cell with an output that generates a fuel cell DC voltage.

34. The method of claim 32, wherein the electric motor is an AC motor.

35. The method of claim 34, further comprising a DC to AC converter system receiving DC power from the auxiliary power source and generating the AC voltage for driving the AC motor in response to control signals from the auxiliary controller.

36. The method of claim 31, further comprising an auxiliary fan for cooling a condenser of the air conditioning system when the ICE is not running, wherein the auxiliary fan is powered in response to the controls signals from the auxiliary controller.

37. A method for operating an air conditioning system for a cabin of a vehicle driven by an internal combustion engine (ICE), wherein a compressor of the air conditioning system has a drive shaft with a hub that is rotated to operate the compressor, the drive shaft of the air conditioning compressor coupled to a first pulley with an electrically operated clutch responsive to control signals, the first pulley rotated by a first belt coupled to the ICE, a jackshaft rigidly coupled to the hub of the air conditioning compressor, a second pulley rigidly coupled to the jackshaft, and an electric motor coupled to the second pulley with a second drive belt, the method comprising:

responsive to the control signals, driving the electric motor with an auxiliary power source to operate the air conditioning system when the ICE is off and the electrically operated clutch disengages the first pulley from the drive shaft of the air conditioning compressor, wherein the auxiliary power source comprises a battery based power source having series and parallel connected battery cells configured to generate a battery DC voltage;

supplying power from the fuel cell DC voltage when the battery DC voltage is below a predetermined low battery value;

charging the battery based power source from the fuel cell DC voltage while providing power when the battery DC voltage is below the predetermined low battery value;

supplying power from both the fuel cell DC voltage and the battery DC voltage in parallel, wherein the battery DC voltage provides a peak current requirement; and supplying power from the battery based power source when the fuel cell DC voltage is below a predetermined low fuel cell value.

38. A method for operating an air conditioning system for a cabin of a vehicle driven by an internal combustion engine (ICE), wherein a compressor of the air conditioning system has a drive shaft with a hub that is rotated to operate the compressor, the drive shaft of the air conditioning compressor coupled to a first pulley with an electrically operated clutch responsive to control signals, the first pulley rotated by a first belt coupled to the ICE, a jackshaft rigidly coupled to the hub of the air conditioning compressor, a second pulley rigidly coupled to the jackshaft, and an electric motor coupled to the second pulley with a second drive belt, the method comprising:

responsive to the control signals, driving the electric motor with an auxiliary power source to operate the air conditioning system when the ICE is off and the electrically operated clutch disengages the first pulley from the drive shaft of the air conditioning compressor, wherein the auxiliary power source comprises a battery based power source having series and parallel connected battery cells configured to generate a battery DC voltage, wherein the auxiliary power source further comprises a fuel cell system with an output that generates a fuel cell DC voltage, wherein a fuel cell in the fuel cell system is a hydrogen fuel cell coupled to a source of pressurized hydrogen and a source of pressurized air.

39. The method of claim 38, wherein the source of pressurized air is supplied by a blower powered by the fuel cell.

40. The method of claim 38, wherein the source of pressurized air is supplied from an external pressurized air source when the fuel cell is in a start-up mode.

41. The method of claim 40, wherein the external pressurized air source is a pressurized tire of the vehicle.

42. The method of claim 39, wherein the auxiliary power source includes the DC to AC converter, the auxiliary controller, the fuel cell, the blower, and the source of pressurized hydrogen.

43. The method of claim 42, further comprising
mounting the auxiliary power source to a chassis of the vehicle; and
electrically coupling the auxiliary power source to the auxiliary fan and cabin controls of the vehicle.

44. The method of claim 41, further comprising starting the vehicle by supplying the hydrogen fuel cell with the external source of pressurized air in an event that the battery based power source and the starter battery are in a discharged state.

45. The method of claim 44, wherein the blower is electrically coupled to the fuel cell DC voltage and operated at a reduced blower speed, in response to control signals from the auxiliary controller, when the fuel cell DC voltage reaches a first value and the blower speed is increased when the fuel cell DC voltage reaches a second value greater than the first value.

46. The method of claim 41, wherein a pressurized tire of the vehicle is coupled to the fuel cell system using a hose with a standard valve stem connector.

47. A method for operating an air conditioning system for a cabin of a vehicle driven by an internal combustion engine (ICE), wherein a compressor of the air conditioning system has a drive shaft with a hub that is rotated to operate the compressor, the drive shaft of the air conditioning compressor coupled to a first pulley with an electrically operated clutch responsive to control signals, the first pulley rotated by a first belt coupled to the ICE, a jackshaft rigidly coupled to the hub of the air conditioning compressor, a second pulley rigidly coupled to the jackshaft, and an electric motor coupled to the second pulley with a second drive belt, the method comprising:

responsive to the control signals, driving the electric motor with an auxiliary power source to operate the air conditioning system when the ICE is off and the electrically operated clutch disengages the first pulley from the drive shaft of the air conditioning compressor, wherein the auxiliary power source comprises a battery based power source having series and parallel connected battery cells configured to generate a battery DC voltage, wherein a starting battery of the vehicle is charged by the auxiliary power source when the starting battery is discharged or is at a low charge state.

48. A method for operating an air conditioning system for a cabin of a vehicle driven by an internal combustion engine (ICE), wherein a compressor of the air conditioning system has a drive shaft with a hub that is rotated to operate the compressor, the drive shaft of the air conditioning compressor coupled to a first pulley with an electrically operated clutch responsive to control signals, the first pulley rotated by a first belt coupled to the ICE, a jackshaft rigidly coupled to the hub of the air conditioning compressor, a second pulley rigidly coupled to the jackshaft, and an electric motor coupled to the second pulley with a second drive belt, the method comprising:

responsive to the control signals, driving the electric motor with an auxiliary power source to operate the air conditioning system when the ICE is off and the electrically operated clutch disengages the first pulley from the drive shaft of the air conditioning compressor, wherein the auxiliary power source comprises a battery based power source having series and parallel connected battery cells configured to generate a battery DC voltage;

generating the control signals with an auxiliary controller in response to cabin controls in the vehicle, wherein the auxiliary controller generates a control signal that signals the clutch to disengage the first pulley from the drive shaft of the air conditioning compressor when the electric motor is powered and driving the jackshaft via the second drive belt, wherein the electric motor is an AC motor; and configuring the AC motor as a generator when the ICE is running and the first pulley is coupled to the drive shaft by the electric operated clutch thereby generating a source of AC power.

49. An air conditioning system comprising:
an air conditioning compressor having a drive shaft with a hub that is rotated to operate the air conditioning compressor;

means for coupling a first pulley to the drive shaft of the air conditioning compressor, the first pulley rotated by a first belt coupled to an internal combustion engine;

means for coupling a second pulley to the drive shaft of the air conditioning compressor, the second pulley rotated by a second belt coupled to an electric motor;

means for disengaging the internal combustion engine from rotating the drive shaft when the electric motor is to rotate the drive shaft; and an auxiliary fan for cooling a condenser of the air conditioning system when the internal combustion engine is not running, wherein the electric motor is powered by a fuel cell system, wherein a starting battery of the internal combustion engine is charged by the fuel cell system when the starting battery is discharged or is at a low charge state.

50. A method for implementing an air conditioning system for a cabin of an internal combustion engine (ICE) vehicle, wherein a compressor of the air conditioning system has a drive shaft with a hub that is rotated to operate the compressor, the method comprising:

coupling a first pulley to the drive shaft of the air conditioning compressor with an electrically operated clutch, the first pulley rotated by a first belt coupled to the ICE of the vehicle;

rigidly coupling a jackshaft to the hub of the air conditioning compressor;

rigidly coupling a second pulley to the jackshaft;

coupling an electric motor to the second pulley with a second drive belt;

coupling an end of the jackshaft not coupled to the hub rotatably with a bearing to a bearing bracket to reduce side loading on the jackshaft from the second drive belt; and driving the electric motor with an auxiliary power source to operate the air conditioning system when the ICE is off and the electrically operated clutch disengages the first pulley from the drive shaft of the air conditioning compressor, wherein the auxiliary power source comprises a battery based power source having battery cells configured to generate a battery DC voltage.

51. The method of claim 50, wherein the auxiliary power source further comprises a fuel cell with an output that generates a fuel cell DC voltage.

52. A method for implementing an air conditioning system for a cabin of an internal combustion engine (ICE) vehicle, wherein a compressor of the air conditioning system has a drive shaft with a hub that is rotated to operate the compressor, the method comprising:

coupling a first pulley to the drive shaft of the air conditioning compressor with an electrically operated clutch, the first pulley rotated by a first belt coupled to the ICE of the vehicle;

rigidly coupling a jackshaft to the hub of the air conditioning compressor, rigidly coupling a second pulley to the jackshaft;

coupling an electric motor to the second pulley with a second drive belt;

driving the electric motor with an auxiliary power source to operate the air conditioning system when the ICE is off and the electrically operated clutch disengages the first pulley from the drive shaft of the air conditioning compressor, wherein the auxiliary power source further comprises a fuel cell with an output that generates a fuel cell DC voltage;

supplying power from the fuel cell DC voltage when the battery DC voltage is below a predetermined low battery value;

charging the battery based power source from the fuel cell DC voltage while providing power when the battery DC voltage is below the predetermined low battery value;

supplying power from both the fuel cell DC voltage and the battery DC voltage in parallel, wherein the battery DC voltage provides a peak current requirement; and supplying power from the battery based power source when the fuel cell DC voltage is below a predetermined low fuel cell value.

53. A method for operating an air conditioning system for a cabin of a vehicle driven by an internal combustion engine (ICE), wherein a compressor of the air conditioning system has a drive shaft with a hub that is rotated to operate the compressor, the drive shaft of the air conditioning compressor coupled to a first pulley with an electrically operated clutch responsive to control signals, the first pulley rotated by a first belt coupled to the ICE, a jackshaft rigidly coupled to the hub of the air conditioning compressor, a second pulley rigidly coupled to the jackshaft, and an electric motor coupled to the second pulley with a second drive belt, the method comprising:

responsive to the control signals, driving the electric motor with an auxiliary power source to operate the air conditioning system when the ICE is off and the electrically operated clutch disengages the first pulley from the drive shaft of the air conditioning compressor, wherein an end of the jackshaft not coupled to the hub rotatably with a bearing is coupled to a bearing bracket to reduce side loading on the jackshaft from the second drive belt.

54. A method for implementing an air conditioning system for a cabin of an internal combustion engine (ICE) vehicle, wherein a compressor of the air conditioning system has a drive shaft with a hub that is rotated to operate the compressor, the method comprising:

coupling a first pulley to the drive shaft of the air conditioning compressor with an electrically operated clutch, the first pulley rotated by a first belt coupled to the ICE of the vehicle;

rigidly coupling a jackshaft to the hub of the air conditioning compressor;

rigidly coupling a second pulley to the jackshaft;

coupling an electric motor to the second pulley with a second drive belt; and coupling an end of the jackshaft not coupled to the hub rotatably with a bearing to a bearing bracket to reduce side loading on the jackshaft from the second drive belt.

\* \* \* \* \*